US007697673B2

(12) United States Patent
Chiu et al.

(10) Patent No.: US 7,697,673 B2
(45) Date of Patent: Apr. 13, 2010

(54) SYSTEM FOR ADVERTISEMENT SELECTION, PLACEMENT AND DELIVERY WITHIN A MULTIPLE-TENANT VOICE INTERACTION SERVICE SYSTEM

(75) Inventors: Leo Chiu, Daly City, CA (US); Peter Loukianoff, Oakland, CA (US)

(73) Assignee: Apptera Inc., San Bruno, CA (US)

( * ) Notice: Subject to any disclaimer, the term of this patent is extended or adjusted under 35 U.S.C. 154(b) by 0 days.

(21) Appl. No.: 11/087,030

(22) Filed: Mar. 21, 2005

(65) Prior Publication Data

US 2005/0180549 A1    Aug. 18, 2005

Related U.S. Application Data

(63) Continuation-in-part of application No. 11/059,970, filed on Feb. 16, 2005, application No. 11/087,030, and a continuation-in-part of application No. 10/803,851, filed on Mar. 17, 2004, now Pat. No. 7,609,829, application No. 11/087,030, which is a continuation-in-part of application No. 11/072,062, filed on Mar. 3, 2005.

(60) Provisional application No. 60/651,603, filed on Feb. 9, 2005, provisional application No. 60/652,161, filed on Feb. 10, 2005, provisional application No. 60/619,295, filed on Oct. 14, 2004, provisional application No. 60/581,924, filed on Jun. 21, 2004, provisional application No. 60/523,042, filed on Nov. 17, 2003.

(51) Int. Cl.
*H04M 15/00* (2006.01)
(52) U.S. Cl. ................................. 379/114.13; 379/88.17
(58) Field of Classification Search ............. 379/88.17, 379/114.13
See application file for complete search history.

(56) References Cited

U.S. PATENT DOCUMENTS

| | | | | |
|---|---|---|---|---|
| 5,884,262 | A * | 3/1999 | Wise et al. ............... | 704/270.1 |
| 5,915,001 | A * | 6/1999 | Uppaluru ................. | 379/88.22 |
| 6,198,977 | B1 * | 3/2001 | Bixler et al. .................. | 700/83 |
| 6,285,987 | B1 * | 9/2001 | Roth et al. ..................... | 705/27 |
| 6,356,876 | B1 * | 3/2002 | Lingham ...................... | 705/14 |
| 6,600,736 | B1 * | 7/2003 | Ball et al. .................... | 370/352 |
| 6,785,653 | B1 * | 8/2004 | White et al. ............. | 704/270.1 |
| 6,847,969 | B1 * | 1/2005 | Mathai et al. ............... | 707/100 |
| 6,874,018 | B2 * | 3/2005 | Wu ............................ | 709/219 |
| 2001/0012335 | A1 * | 8/2001 | Kaufman et al. ........... | 379/67.1 |
| 2001/0032234 | A1 * | 10/2001 | Summers et al. ............ | 709/201 |
| 2002/0010626 | A1 * | 1/2002 | Agmoni ....................... | 705/14 |
| 2002/0052747 | A1 * | 5/2002 | Sarukkai ..................... | 704/270 |

(Continued)

OTHER PUBLICATIONS

U.S. Appl. No. 60/651,603, Leo Chiu et al.

(Continued)

*Primary Examiner*—Simon Sing
(74) *Attorney, Agent, or Firm*—Steven R. Sponseller; Stevens Law Group

(57) ABSTRACT

An advertisement delivery system for publishing a voice-enabled advertisement chosen among multiple voice-enabled advertisements to a specific voice application version chosen among multiple voice application versions available to the system has a telephony interface for enabling voice interactive access to at least one running version of the chosen voice application; and a matching service application for determining selection of the advertisement, the voice application version to host the advertisement, and at least one advertisement position in the voice application version for presenting the advertisement.

18 Claims, 14 Drawing Sheets

U.S. PATENT DOCUMENTS

2002/0062393 A1* 5/2002 Borger et al. ............... 709/246
2004/0186778 A1* 9/2004 Margiloff et al. ............. 705/14

OTHER PUBLICATIONS

U.S. Appl. No. 60/652,161, Leo Chiu et al.
U.S. Appl. No. 11/059,970, Leo Chiu.
U.S. Appl. No. 60/619,295, Leo Chiu.
U.S. Appl. No. 60/581,924, Rick DeGolia.
U.S. Appl. No. 10/803,851, Sandy Chai-Jen Wang et al.
U.S. Appl. No. 60/523,042, Sandy Chai-Jen Wang et al.

* cited by examiner

SYSTEM FOR ADVERTISEMENT SELECTION, PLACEMENT AND DELIVERY WITHIN A MULTIPLE-TENANT VOICE INTERACTION SERVICE SYSTEM

CROSS-REFERENCE TO RELATED DOCUMENTS

The present application claims priority to provisional application Ser. No. 60/651,603, filed on Feb. 9, 2005. The present application also claims priority to provisional application Ser. No. 60/652,161, filed on Feb. 10, 2005. The present application also claims priority as a CIP to U.S. non-provisional patent application Ser. No. 11/059,970, filed on Feb. 16, 2005 which claims priority to provisional application Ser. No. 60/619,295, filed Oct. 14, 2004. The present application also claims priority to U.S. provisional patent application Ser. No. 60/581,924, filed on Jun. 21, 2004. The present application also claims priority as a CIP to U.S. non-provisional patent application Ser. No. 10/803,851, filed on Mar. 17, 2004 now U.S. Pat. No. 7,609,829 which claimed priority to provisional application Ser. No. 60/523,042 filed Nov. 17, 2003. The present application also a continuation in part application to U.S. non-provisional patent application Ser. No. 11/072,062, filed on Mar. 3, 2005 entitled "Multi-Tenant Self-Service VXML Portal".

FIELD OF THE INVENTION

The present invention is in the area of voice application software systems and pertains particularly to methods and a system for enabling advertisement configuration and delivery within a multiple-tenant VXML application system according to heuristically calculated caller statistics, and application content.

BACKGROUND OF THE INVENTION

With the relatively recent advent of voice extensive markup language (VXML) the expertise required to develop a speech application solution has been reduced somewhat. VXML is a language that enables a software developer to focus on the application logic of the voice application without being required to configuring underlying telephony components. Typically, the developed voice application is run on a VXML interpreter that resides on and executes on the associated telephony system to deliver the solution.

A typical architecture of a VXML-compliant telephony system comprises a voice application server and a VXML-compliant telephony server. To develop and deploy a typical VXML voice application, an application database is created or an existing one is modified to support VXML. Application logic is provided and is designed in terms of workflow and is adapted to handle the routing operations of the delivery system. A VXML rendering engine is provided and adapted to render VXML pages, which are results of functioning application logic. These pages, which are used as input for voice synthesis, are rendered according to a specific generation sequence or call flow.

A VXML-enabled voice portal, which may be a telephony server, is adapted to enable retrieval of VXML pages from the VXML rendering engine. A VXML interpreter, a voice recognition text-to-speech engine, and the telephony hardware/software are combined to provide voice interface function. In prior art, the telephony hardware/software along with the VXML interpreter are packaged as an off-the-shelf IVR-enabling technology. Arguably the most important feature, however, of a VXML system is the voice application server. Voice application logic is typically written in a programming language such as Java and packaged as an enterprise Java Bean archive. The application presentation logic required is handled by the VXML rendering engine 111 and is typically written in JSP or PERL.

The inventor is aware of a VXML-enabled voice application development and deployment system referenced herein in the cross-reference section that is adapted for economic development and deployment of voice applications. The system uses a voice application server for creating and serving voice applications to clients over a communication network. The applications are executed from a voice portal node having access to a communication network. The voice application server is capable of inferring one or more client needs based on client data including input data.

The voice application server includes an inference engine executable from the application server. The inference engine is called during one or more predetermined points of an ongoing voice interaction with a voice application and determines whether an inference of client need can be made based on analysis of existing data related to the interaction during a predetermined point in an active call flow of the served voice application. If an inference is warranted, the engine pre-orders an inference dialog and directs the voice application to serve the dialog in the call flow instead of the normally served dialog.

The inventor also knows of a VXML server, disclosed by reference in co-pending application, that can take client behavior attributes into consideration and use those attributes to select appropriate dialogs from a pool of dialogs that will better serve the customer according to the perceived behavioral state of the caller detected through interaction. In some cases the system is adapted for maintaining and consulting interaction history attributes and results experienced with that customer to determine if an inference is warranted.

VXML response flexibility has also been extended to the realm of advertising in certain systems known to the inventor, one of which is listed in the cross-reference section of this specification. For example, a system is known to the inventor that is capable of selecting an advertisement from a pool of advertisements and for causing the selected advertisement to be utilized by a voice application for presentation to a caller during an automated voice interactive session. The system monitors the voice interaction between a caller and the voice application and selects an appropriate ad, serving at least identification and location of the ad to be retrieved and presented to the caller via the voice application. In preferred application, the server accepts and analyses data about the caller comparing the results against at least one rule. The resulting value provides reference to the advertisement selected. In this system the ads may be third-party ads that may be inserted into the running voice application flow and thus heard by the caller.

Further to the above, a system referenced herein in the cross-reference section, is also known to the inventor that is capable of leveraging an existing Web service to provide access to back-end data information or information system data, normally provided to Web users, to telephone callers. This system includes a first network service node for hosting the Web service, an information database accessible from the service node, a voice terminal connected to the first service node, and a service adaptor for integrating a voice application executable from the voice terminal to the Web service. In a preferred aspect, the service adaptor subscribes to data published by the Web service and creates code and functional modules based on that data and uses the created components to facilitate creation of a voice application or to update an existing voice application to provide access to and leverage of the Web service to telephone callers.

The above-described systems can be combined into one system that is enhanced with all of the above-mentioned capabilities. The prevailing goal in development of such enhancements and capabilities known to the inventor is to streamline development and deployment operations and to enable more efficient and accurate service to clients of enterprises leveraging the voice solutions.

The inventor is further aware of a multi-tenant voice extensible markup language (VXML) voice system referenced in the cross-reference section of this specification, which includes a voice portal connected to at least one telephony network; a voice application server integrated with the voice portal; and a multi-tenant configuration application integrated with the voice application server, the configuration application accessible to the tenants from a data packet network. In this multi-tenant system, administrators of enterprises may log in to the configuration wizard and create new or modify voice application functionality specific to those represented enterprises. The enterprise-specific functionality is applied to existing common voice application architecture available to all of the subscribing enterprises. In this system, a centralized voice portal detects callers attempting to reach various subscribed enterprises and executes the appropriate enterprise-specific voice applications based on caller ID and association to the enterprise called. In this way, many disparate enterprises are served in an efficient and secure manner wherein those served enterprises have flexible control over their own application function and treatment of their customers.

It has occurred to the inventors that many enterprises that configure and leverage their own VXML voice applications through a multi-tenant system may also desire that their customers receive targeted advertising through interaction with their enterprise-specific voice applications. Likewise, many advertisers or ad-service companies desire new vehicles for placing advertisements in a fashion that may reach target customers, therefore retaining a higher conversion rate.

What is clearly needed is a multi-tenant advertisement delivery system and network configured to a multi-tenant VXML voice system. A system and network such as this would enable a new competitive advertising vehicle controlled by both advertisers and advertisement publishers.

SUMMARY OF THE INVENTION

An advertisement delivery system is provided for publishing a voice-enabled advertisement chosen among multiple voice-enabled advertisements to a specific voice application version chosen among multiple voice application versions available to the system. The system includes a telephony interface for enabling voice interactive access to at least one running version of the chosen voice application; and a matching service application for determining selection of the advertisement, the voice application version to host the advertisement, and at least one advertisement position in the voice application version for presenting the advertisement.

In a preferred embodiment, the voice-enabled advertisement is a voice extensible markup language text string or a voice extensible markup language executable object. In one embodiment, the voice-enabled advertisement is one or a collection of pre-recorded voice files and voice extensible markup language executable code. Also in a preferred embodiment, the voice application versions are enterprise-specific variants constructed over common voice application architecture. In a preferred embodiment, text-to-speech voice synthesis is used to play the advertisement.

In one embodiment, determination of selection includes a first match of acceptable advertisers to the publisher and a second match of a winning advertisement to the at least one advertisement position in the voice application version. In a preferred embodiment, determination of an advertisement selected to present from an advertisement position within a voice application is based on content relevancy of the ad to the application; relevancy of caller attributes to advertisement; or a combination thereof.

In one embodiment, the matching service application includes a configuration manager for enabling advertisers to register advertisements and to configure advertisement publishing parameters. In one embodiment, the system further includes a publisher configuration manager for enabling publishers to create advertisement publishing conditions and constraints.

In all aspects, the advertisement may be one of a non-interactive advertisement or one of an interactive advertisement. In a preferred application, determination of the advertisement includes recognition of a highest bid.

According to anther aspect of the present invention, a service application is provided for determining an advertisement from multiple advertisements for placement in a voice application version identified among multiple voice application versions available to the system. The application includes a first application interface enabling receipt of data about an identified caller accessing the identified voice application version and data about candidate advertisements; a second application interface enabling access to the multiple advertisements and for enabling insertion of or execution of one or more of those advertisements relative to the identified voice application version; a third application interface enabling access to constraints and conditions; and a machine instruction for processing the data about the caller and data about the advertisements against the constraints and conditions to form a determination result for placing the advertisement.

In a preferred embodiment, the advertisement is voice-enabled in the form of a voice extensible markup language text string or a voice extensible markup language executable object. In one embodiment, the advertisement is voice-enabled in the form of one or a collection of pre-recorded voice files and voice extensible markup language executable code. In one embodiment, data about the caller includes data describing one or a combination of real time caller attributes observed while navigating the voice application version. In one embodiment, data about the caller includes data describing one or a combination of profiled attributes of the caller acquired during one or more previous interaction with the caller.

In a preferred embodiment, the voice application versions are enterprise-specific variants constructed over common voice application architecture. Also in a preferred embodiment, the constraints and conditions include those configured by advertisers and those configured by ad publishers. Further in a preferred embodiment, the determination result includes identification of one or more advertisement placement positions identified within the voice application version. In one embodiment, interaction with a placed advertisement includes caller receipt of some acknowledgement, confirmation, or indication of product or service participation.

According to another aspect of the present invention, a method for determining, which among multiple candidate advertisements will be presented to a caller interacting with a voice application version is provided. The method includes steps for: (a) identifying an incoming call; (b) connecting the identified call to a voice application version subject to the call; (c) identifying a pool of advertisements approved for consideration for placement in the identified voice application version; (d) compiling data about the caller and the advertisements; (e) processing the data complied against a set of constraints and conditions; (f) determining the candidate advertisement based on the result of (e).

In one aspect, in step (a), the call is identified by one or a combination of voice interactive dialog and number identification service. In one aspect, in step (b), the application version is executed immediately before caller connection. In one aspect, in step (b), the caller is connected to the application version while running and servicing at least one other caller.

In one aspect of the method, in step (c), the voice application version runs within an enterprise skin and the advertisement pool is a collection of enterprise skins executable to join the enterprise skin. Also in one aspect, in step (d) data about the caller includes one or a combination of real time caller behavioral attributes, caller historical activity, and caller profile attributes. In a preferred aspect, in step (f), the determination is based in part of amount of compensation bid for placement of the advertisement.

In still another aspect of the present invention, a machine-readable instruction for causing a machine to perform steps of: (a) identifying an incoming call; (b) connecting the identified call to a voice application version subject to the call; (c) identifying a pool of advertisements approved for consideration for placement in the identified voice application version; (d) compiling data about the caller and the advertisements; (e) processing the data complied against a set of constraints and conditions; (f) determining the candidate advertisement based on the result of (e).

BRIEF DESCRIPTION OF THE DRAWING FIGURES

DESCRIPTION OF THE PREFERRED EMBODIMENTS

Figure 7:
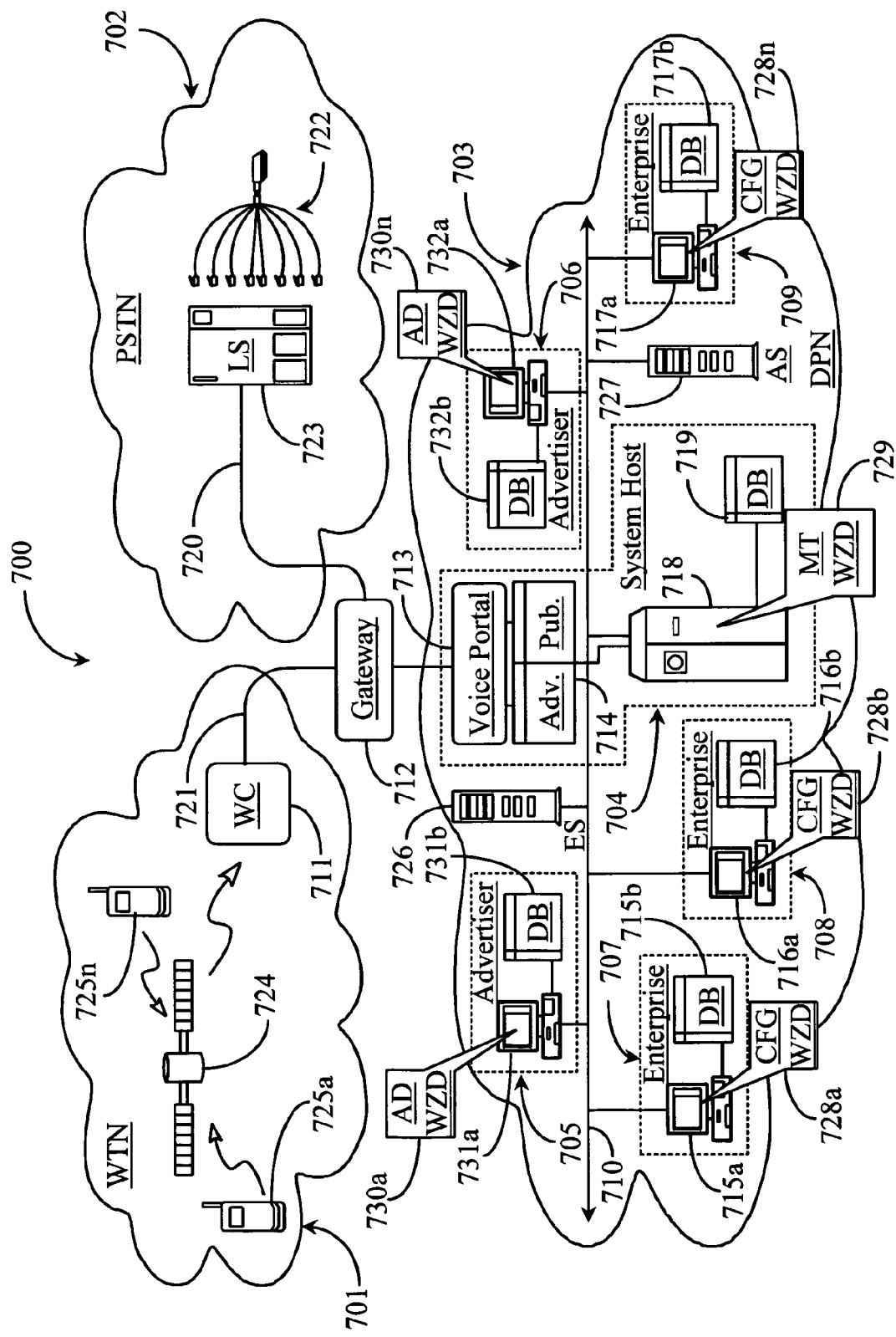
FIG. 7 is an architectural view of a multi-tenant advertisement delivery network and system host according to an embodiment of the present invention.

FIG. 7 is an architectural overview of a multi-tenant advertisement delivery network 700 and system host 704 according to an embodiment of the present invention. Ad delivery network 700 includes a data-packet-network (DPN) 703, a public-switched-telephone-network (PSTN) 702, and a wireless-telephone-network (WTN) 701. Data packet network 703 may be a wide-area-network (WAN) such as the well-known Internet network and may be referred to herein after as Internet 703. In other embodiments, network 703 may be a wirelessly accessible municipal area network (MAN). Sub-networks such as Intranets, local area networks (LANs) and VIP network segments shall be included in the overall description of Internet 703.

PSTN network 702 is, in a preferred embodiment, a publicly accessible network as is WTN 701, which may be a cellular network. The inventor chooses publicly accessible networks in illustration as a preferred embodiment to demonstrate the wide geographic reach of the system of the present invention. However, the system of the invention may also be scaled to specific geographic regions without departing from the spirit and scope of the present invention.

Internet 703 has a network backbone 710 illustrated therein and meant to represent all of the lines, equipment, and access points that make up the Internet network as a whole. Therefore, there are no specific geographic limitations to the practice of the present invention. Backbone 710 shall include all sub-networks that may host or support networked nodes that have access to the Internet from their locations.

System host 704 is illustrated within Internet 703 and serves, in this example, as a host for a multi-tenant voice application service and as a host for locating and directing service of advertisements into running voice applications. Host 704 includes, among other standard equipment groupings, a voice application server 718 adapted to maintain and serve voice application functionality to subscribing enterprises. Host 704 maintains at least one voice portal 713, adapted in this case as a digital voice portal system accessible from both networks 701 and 702 through a telephony gateway 712. Voice portal 713 may be assumed to contain all of the hardware and software required for accepting and processing incoming call requests and for connecting those calls to enterprise-specific voice applications as was described.

Voice portal 713 includes a portion thereof given the element number 714, for maintaining knowledge of all subscribed publishers (Pub.) or enterprises that may be identified to specific callers by destination number called or by other identification methods adapted to route specific calls to specific enterprises. In one enhanced embodiment, all subscribed advertisers that may be registered to the system of the invention may also be identifiable from the point of voice portal 713, more particularly, from portion 714.

It is noted herein that in one embodiment portal 713, adv./pub. Portion 714 and voice application server 718 may all reside on a single host node adapted to practice the present invention. In other embodiments there may be more than one portal 713 hosted as well as more than one application server hosted without departing from the spirit and scope of the present invention. One with skill in the art of network architecture will appreciate that various system components may be provided in plural and distributed geographically without departing from the spirit and scope of the present invention.

Figure 1:
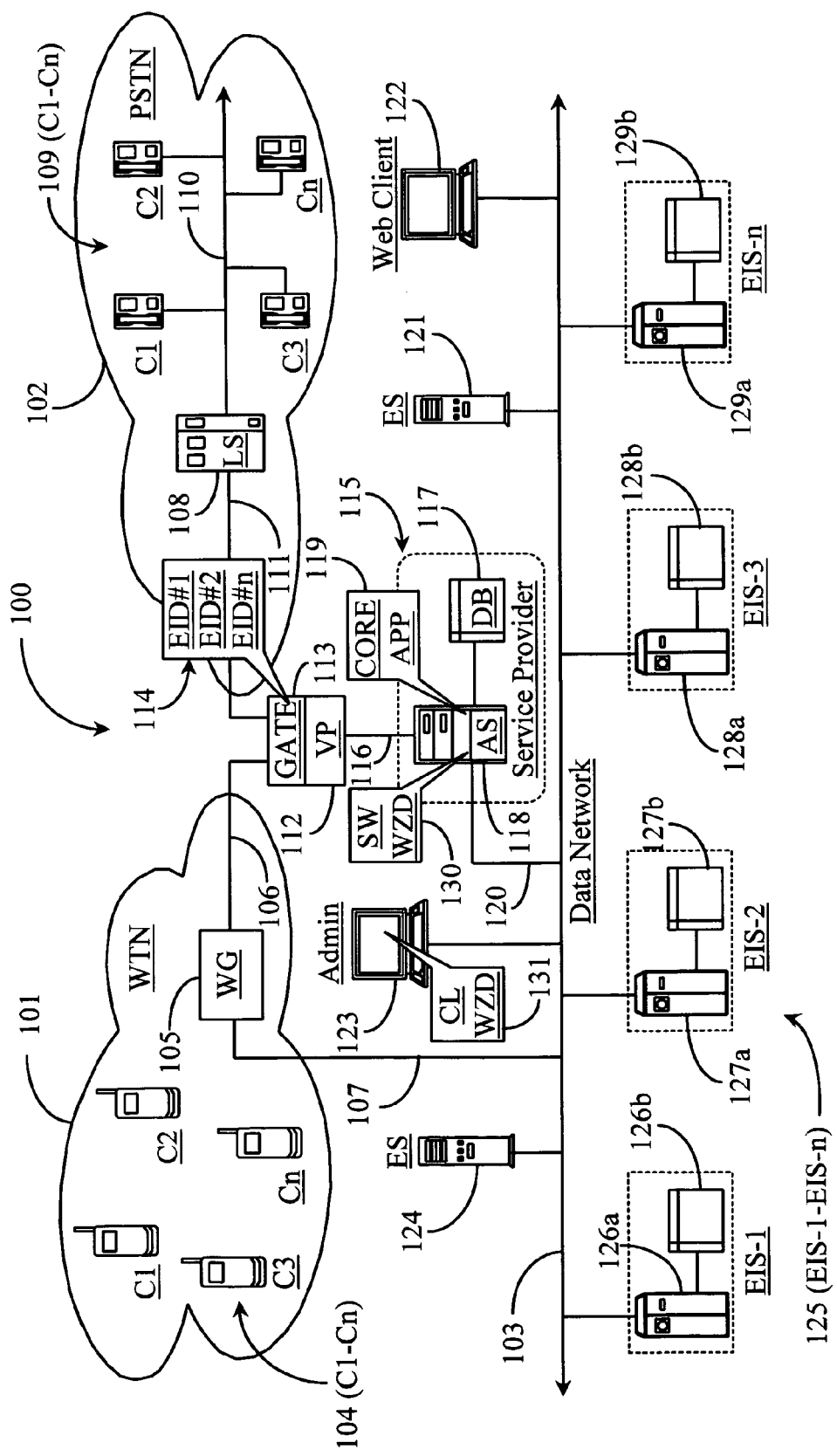
FIG. 1 is an architectural overview of a communications network including a multiple-tenant VXML service provider according to an embodiment of the present invention.
Figure 2:
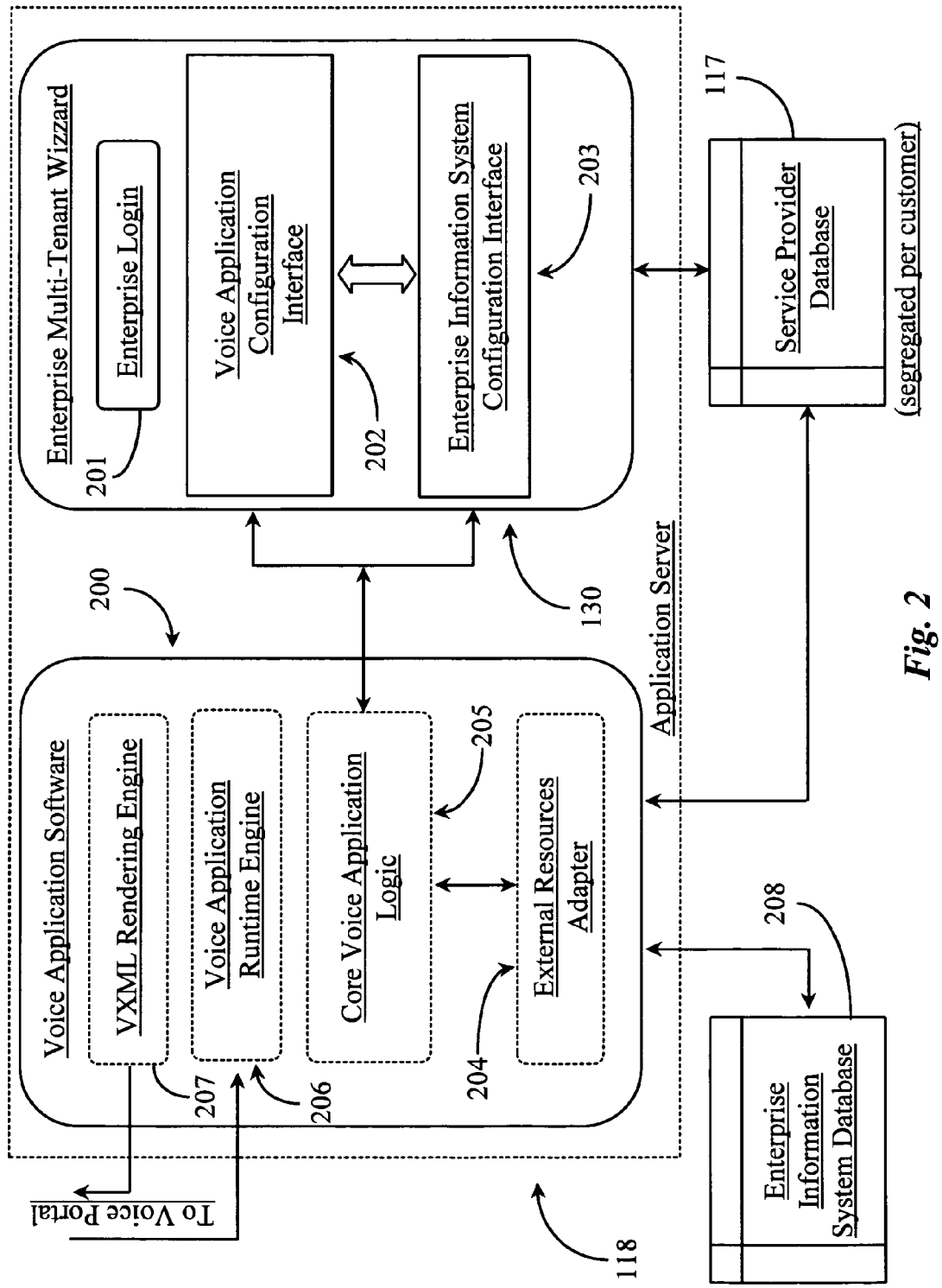
FIG. 2 is a block diagram illustrating basic components of a VXML application and multi-tenant wizard according to an embodiment of the present invention.
Figure 3:
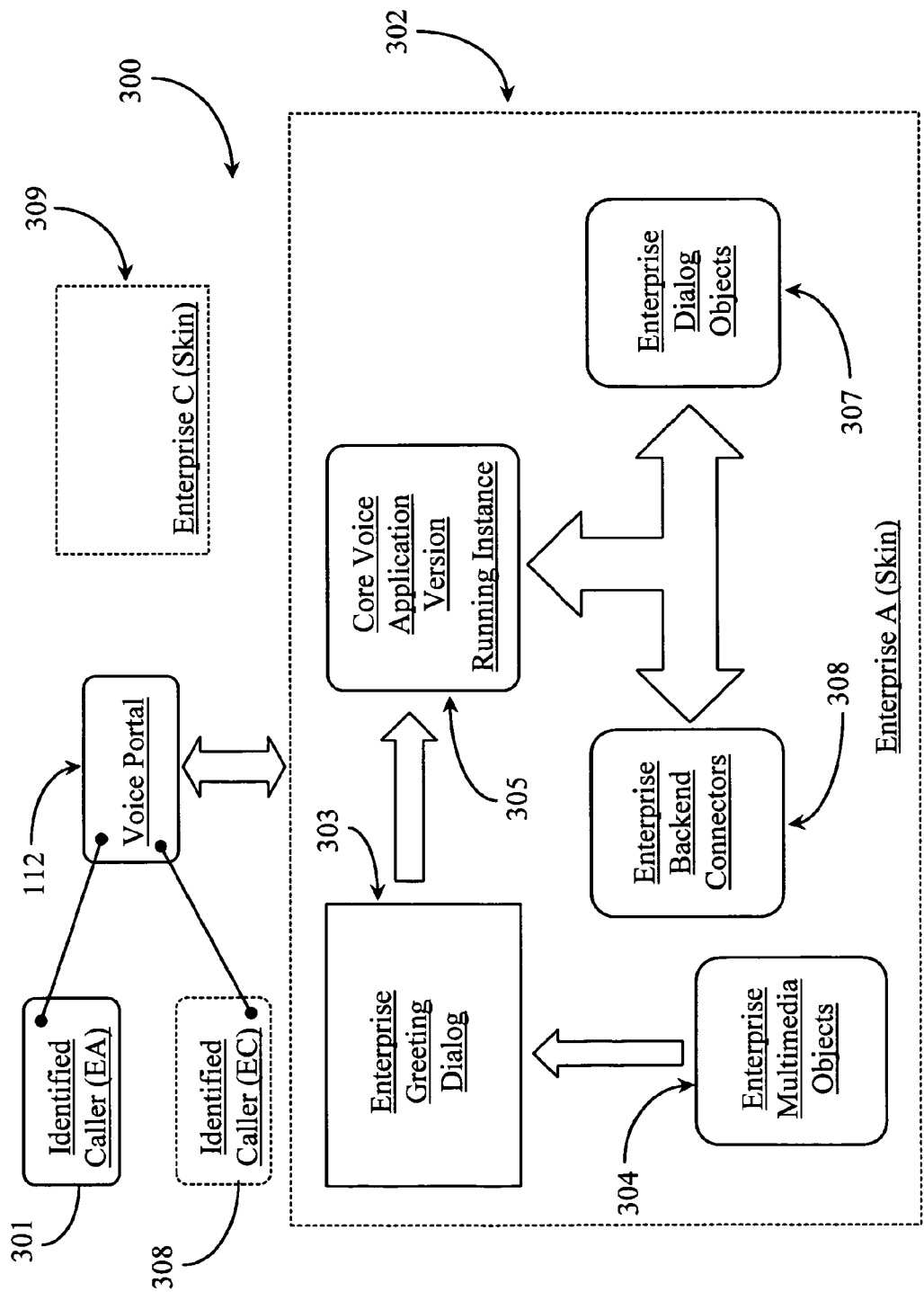
FIG. 3 is a block diagram illustrating components of an enterprise-specific application shell according to an embodiment of the present invention.
Figure 4:
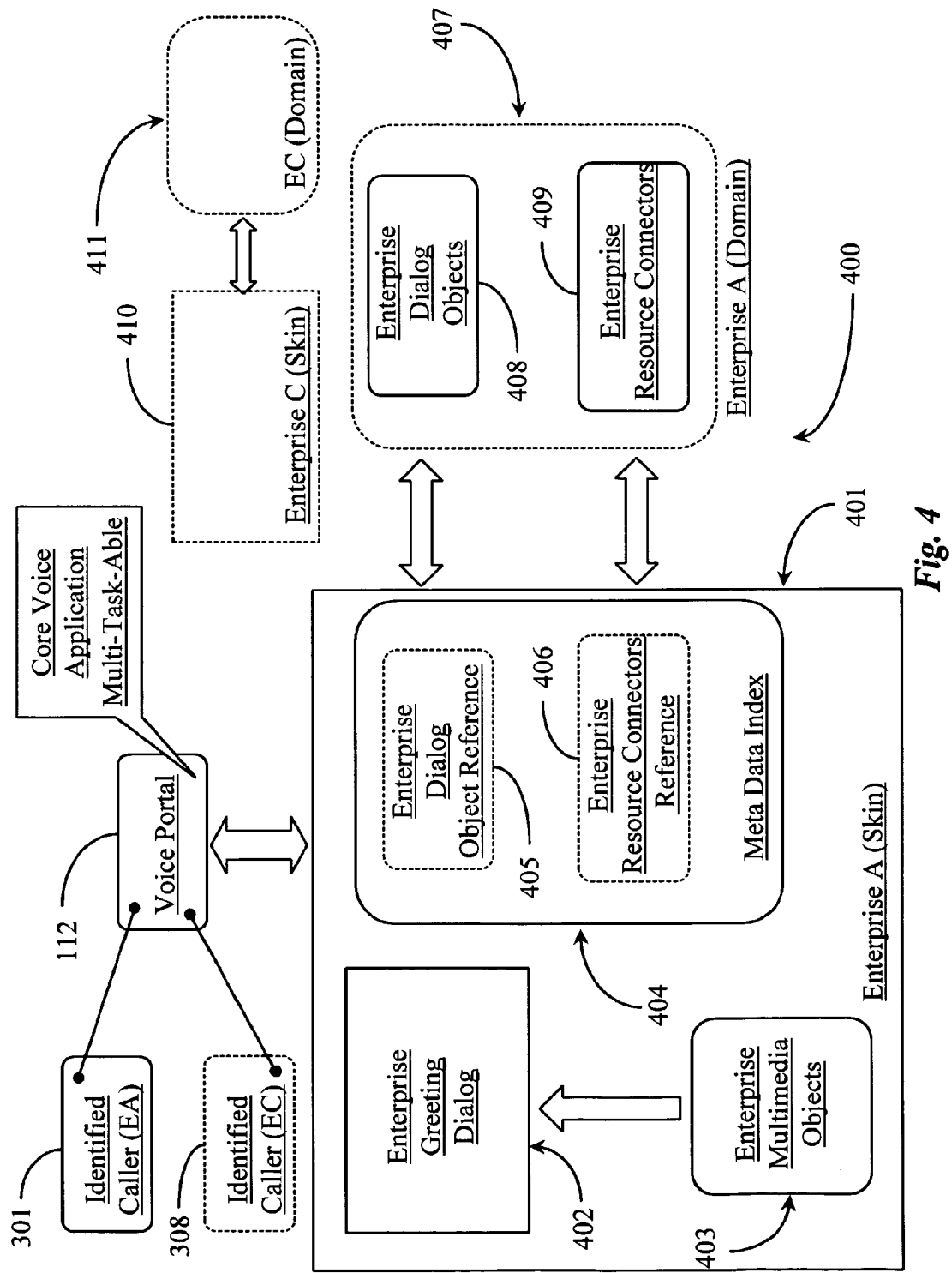
FIG. 4 is a block diagram illustrating components of an enterprise-specific application shell according to another embodiment of the present invention.
Figure 5:
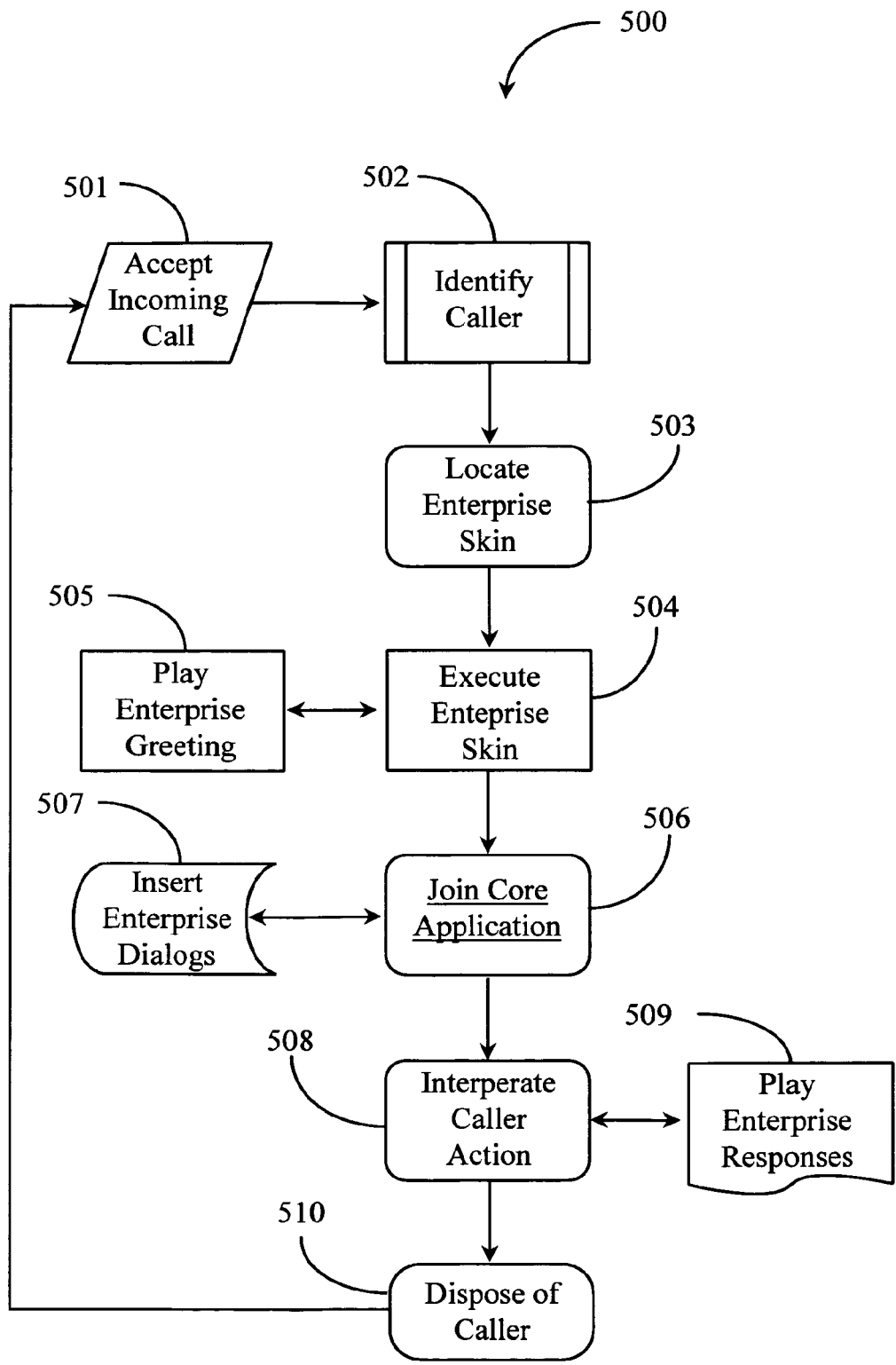
FIG. 5 is a process flow chart illustrating steps for accessing and interacting with an enterprise specific version of a core voice application according to an embodiment of the present invention.
Figure 6:
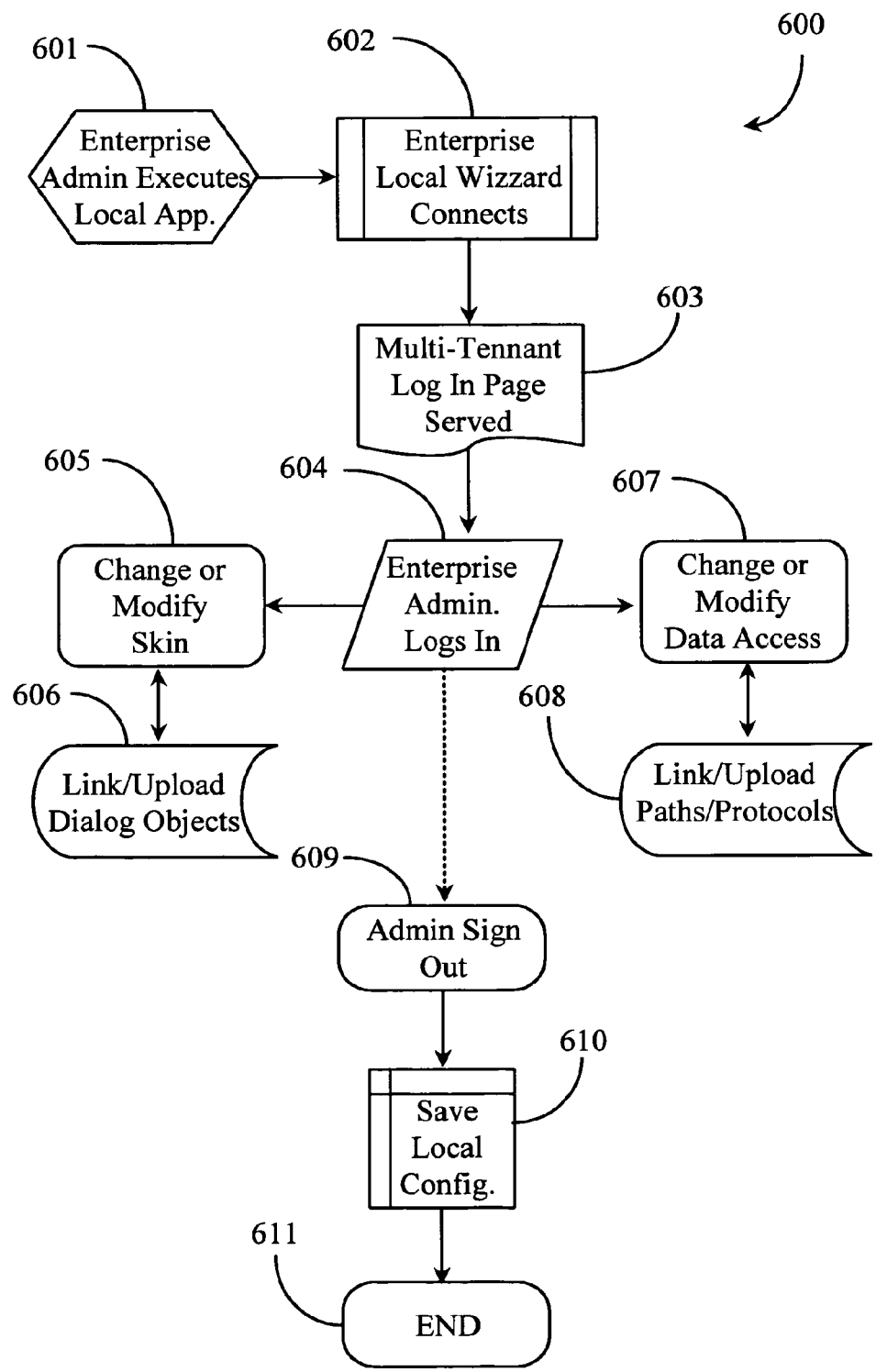
FIG. 6 is a process flow chart illustrating steps for administering modifications to an enterprise-specific application shell according to an embodiment of the present invention.

Application server 718 has a database 719 connected thereto and adapted as a service provider database for maintaining data about enterprisers, advertisers, and other data that may be generated and maintained by the host. A multiple-tenant configuration wizard (MT WZD) 729 is provided to system host 704, more particularly, to execute on voice application server 718. Wizard 729 is similar to wizard 130 described with reference to FIG. 1 above with an exception that now enterprises, who may be ad publishers, and advertisers, as well as third-party advertising enterprises may all subscribe to and use wizard 729 for the purpose of configuring advertisement placement parameters, and advertisement acceptance criteria. Administrators of the various enterprises and advertisers may access wizard 729 via login or other secure procedure.

Internet network 703 has a plurality of enterprise domains illustrated therein and shown connected to backbone 710 for communication. These enterprises are illustrated herein as enterprise domain 707, enterprise domain 708, and enterprise domain 709. In this example, enterprise domain is defined as a physical boundary within which enterprise equipment resides such as within a building.

Each enterprise 707-709 may be considered in this example, a subscriber to voice application services offered through system host 704. Enterprise 707 includes, for illustrative purpose only, an administrator node 715a and an enterprise information system (EIS) database 715b. Administrator node 715a is typically a desktop computer station, but may be any type of network-capable node with a graphic user interface (GUI). Other typical enterprise equipment may be assumed present in this example although not explicitly illustrated. Enterprises 708 and 709 are likewise equipped with administrator nodes 716a and 717a respectively and EIS databases 716b and 717b respectively.

Each enterprise administrator node 715a-717a has a configuration wizard (CFG WZD) optionally provided thereto and adapted as a local client application that connects to and communicates with multiple-tenant wizard 729. Configuration wizard 728a resides on and is executable from node 715a in enterprise domain 707. Configuration wizard 728b resides on and is executable from node 716a within enterprise domain 708.

Configuration wizard 728n resides on and is executable from node 717a within enterprise domain 709. The purpose of configuration wizards 728a-728n is to enable each separate enterprise to save a local configuration relating each enterprise-specific configuration performed with respect to multiple-tenant wizard 729. In one respect, wizards 728a-728n are similar to client wizard 131 of FIG. 1 reference in application with an exception that in addition to facilitating a locally saved configuration of voice application functionality applied over a common voice application architecture supplied by a system host, the wizard enables an advertisement mode for facilitating configuration of both advertisement data for placement and parameters for accepting advertisement placement originated by other source enterprisers or advertisers. Therefore, an enterprise may configure voice application functionality for its customers and from the perspective of an ad publisher and/or advertiser. In these modes, the enterprise may configure ads for placement and acceptance criterion for ad acceptance.

A plurality of advertiser domains are illustrated within Internet domain 703 and shown connected to backbone 710 for communication. These are an advertiser domain 705 and an advertiser domain 706. The term domain may represent the physical domain of the advertiser whether a small entity or a large advertisement company. Advertiser domain 705 includes an administrator node 731a, which may be adapted as a workstation with a GUI, or any other network-capable node with a GUI.

Advertiser domain 705 also includes a database 731b shown connected to administrator node 731a. Database 731b is adapted to contain the advertisers' data including but not limited to current ads, configuration data, and any other data the advertiser deems important and therefore storable. Likewise, advertiser domain 706 includes an administrator node 732a and a database 732b. Advertisers 705 and 706 may simply be small single entities seeking to advertise their own products. In another embodiment, advertisers 705 and 706 may be third-party advertising agencies or companies creating and placing advertisements for other enterprises.

In either of the above-described advertiser embodiments, administrator nodes 731a and 732a may optionally be provided with local advertisement wizards (AD WZD) 730a and 730n respectively. In this case it is presumed that advertisers 705 and 706 do not necessarily subscribe to voice application services of the host other than subscription to ad placement services. However, the capabilities of configuring voice application functionality over common voice application architecture may be provided for the purpose of configuring static and interactive advertisements that may be "plugged in" to or otherwise inserted into enterprise-specific voice applications.

In one embodiment both enterprises and advertisers may maintain remote servers connected to backbone 710 for communication. Remote servers are illustrated in this embodiment as an enterprise server (ES) 726, and an advertisement server (AS) 727. ES 726 may be hosted by any of enterprises 707-709 and may be adapted as a source of enterprise information that may be retrieved and presented to callers interacting with an enterprise-specific voice application through voice portal 713 of host 704. In one embodiment, ES 726 may host a specific Web service that may be leveraged by host system 704 for the purpose of providing information to callers connected to voice portal 713. An example may be that of a bank offering an ATM location service. In this case an enterprise-specific voice application may be adapted to leverage the existing Web service.

AS 727 may be an ad server hosted by any of advertisers 705 or 706 and adapted for the purpose of holding and serving advertisements upon request from remote systems such as host system voice application server 718 for example. It is noted herein that ads stored for service in AS 727 are, in a preferred embodiment, adapted according to the present invention as ads that may be of a suitable form to be plugged into a voice application in real time. Examples include XML text strings, multimedia sound objects, or voice XML objects. In one embodiment, advertisers may keep their ads stored for service in respective databases 731b and 732b. In still another embodiment ads may be physically uploaded to database 719 for local service. There are many possible combinations.

PSTN 702 has a local telephony switch (LS) 723 illustrated therein and adapted as a private branch exchange (PBX) or an automated call distributor (ACD) type telephony switch. Switch 723 is connected to gateway 712 via a telephony trunk 720. Gateway 712 receives calls routed thereto by switch 723. Callers routed to gateway 712 are represented in this example as callers 722.

A wireless carrier (WC) 711 is illustrated within WTN 701 and is adapted as a gateway to route wireless calls over a telephony trunk 721 to gateway 712. Gateway 712 is adapted to receive routed calls from PSTN 702 and from WTN 701 and to connect those calls based number dialed to voice portal 713. Callers placing calls from within WTN 701 are represented herein as callers 725a-725n. In this example, a wireless satellite 724, which may alternatively be a cellular tower, routes the wireless telephony traffic to WC 711, which in turn, routes calls received to gateway 712 over trunk 721.

In practice, voice portal 713 has a compiled and updateable list of all of the destination numbers and extensions provided by subscribing enterprises so that incoming calls may be identified specifically to an enterprise skin and further to an enterprise-specific greeting and voice application as was described with reference to co-pending application. Upon receiving a call voice portal 713 may identify the received call to an enterprise skin and cause execution of the enterprise skin within which the enterprise-specific voice application may be launched and the caller subsequently connected to the application. Portal 713 has a direct connection to voice application server 718 and the actual voice application functionality may be executed and served to portal 713 from within application server 718. In another embodiment, portal 713 and application server 718 are combined into one machine.

In a preferred embodiment of the present invention, advertisers such as advertiser 705 and 706 may compete for placement of ads to customers of enterprises using the voice application services provided by host 704 in such as way that the placed advertisements are presented to callers based on information known or acquired about the caller. The practice is similar in some respects to a dynamic ad placement system known to the inventor and described with reference to co-pending application referenced in the cross-reference section of this specification.

However, in this system advertisers compete for placement among more than one enterprise and are matched by the host system to enterprise-specific voice applications according to competitive bidding rules and advertisement acceptance criteria set by the enterprises that agree to present the ads. In this system the perceived value of ad placement may change dynamically according to what may be perceived of caller state in real time. Instead of negotiating directly with specific enterprises, system host 704 brokers the ad placement and makes a decision as to which advertisement belonging to which advertiser will ultimately be selected and presented during an enterprise-specific interaction with a customer of that enterprise.

As described further above, multiple-tenant wizard 729 includes the real time capability of deciding which of many competing advertisers will have advertisements placed in which enterprise-specific voice applications. Information submitted to wizard 729 is submitted thereto on an ongoing basis as advertisers and publishers create new advertisements for placement and new voice application functionality to present to customers. In a preferred embodiment, advertisers who are not classed as enterprises and therefore do not specifically subscribe to voice application services provided by host 704, may subscribe to ad placement services and may also be provided with VXML tools for constructing their advertisements so that they may be "plugged into" advertisement slots provided in the voice applications presented by enterprise publishers selling advertisement space.

One with skill in the art will appreciate that, collectively, advertisements from various advertising entities may be physically uploaded using a client like client wizard 730a, for example, connected to multiple-tenant wizard 729. Such advertisements may be maintained in a local ad pool, perhaps in service provider database 719. Likewise, the technology allows for location of and retrieval of the advertisements from locally maintained databases in dynamic fashion using high-speed network connections. Likewise, enterprises may run their own advertisements that may also be competitively placed in applications hosted by other enterprises. In this sense, an enterprise may be a publisher and an advertiser. Therefore, system 704 creates a competitive and dynamic ad placement network that may not previously be possible with typical enterprise-hosted voice application systems.

Figure 8:
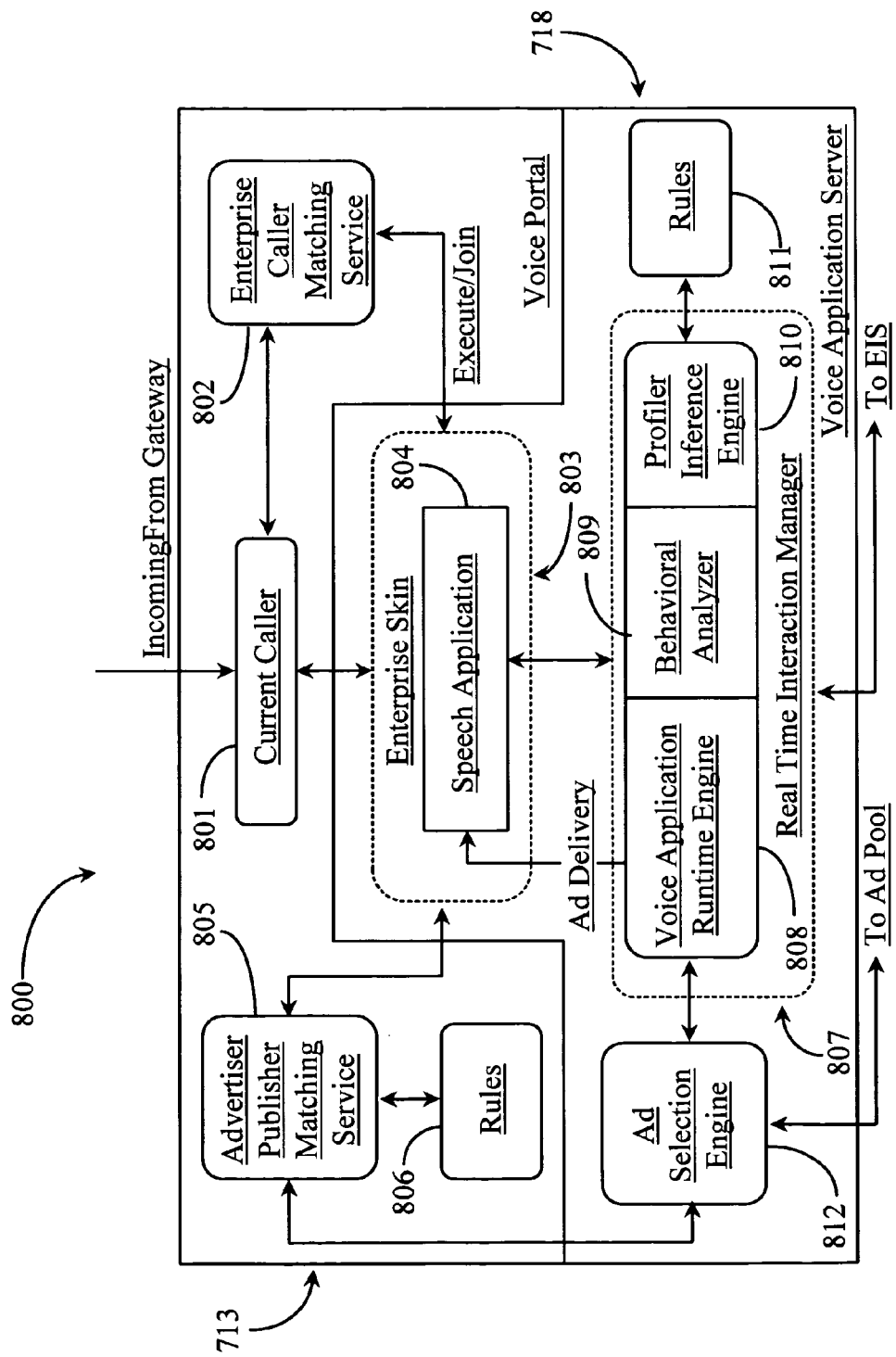
FIG. 8 is a block diagram illustrating components of a voice application server enhanced for selecting and inserting ads into a voice application according to an embodiment of the present invention.

FIG. 8 is a block diagram 800 illustrating components of voice application server 718 and voice portal 713 enhanced for selecting and inserting ads into a running speech application according to an embodiment of the present invention. In this embodiment, voice portal 713 and voice application server 718 are tightly integrated and may be provided as software instances running on a single node. In this case, portal 713 performs at least 2 services, one of which is matching a caller to a specific enterprise. An enterprise/caller matching service application or module 802 is provided and adapted to match an incoming call represent3ed herein as a current caller 801 to a specific enterprise. This may be accomplished using automated number identification or destination number identification services.

Voice portal 713 matches the current call to an enterprise skin represented herein as skin 803, which is an enterprise-specific container, within which enterprise-specific voice application functionality can be presented. In this embodiment, application server 718 serves enterprise skin 803. Skin 803 is locatable within server 718 and executed to run if not already active in the system. In this example, service 802 locates and executes skin 803 based on results from matching caller ID or number to enterprise. Once launched, caller 801, in this example, is connected to speech application 804 running within skin 803. If skin 803 and application 804 are already running, then the matching service simply connects caller 801 to application 804.

Application 804 may comprise a generic enterprise greeting, which may be first presented to all connected callers. More than one speech application option may be presented for selection during caller navigation of the enterprise greeting, which upon selection made may invoke the appropriate speech application dialog, which is then presented to the caller. An interaction manager 807 running in application server 718 monitors enterprise skin 803 in a running state in real time in this embodiment. Interaction manager 807 is adapted to monitor each caller experience with voice application 804. In addition manager 807 has access to caller identification and any available data previously compiled about that caller.

Manager 807 includes a voice application runtime engine that controls both the presentation of speech application dialogs and result presentation. Runtime engine 808 also controls, in this embodiment, delivery of selected advertisement dialogs into speech application 804 at appropriate junctures identified in the application dialogs presented. Advertisements may, in one embodiment, be selected based on caller behavior during navigation. Therefore, a behavioral analyzer 809 is adapted to collect caller behavioral information including historical behavior during previous interactions, and compare the results against a set of rules, illustrated herein as rules 811 for the purpose of dialog optimization (choosing from more than one possible option) and for use in determining which of more than one identified advertisement may be delivered into a pending "ad slot" in the dialog selected.

If there are no ad slots in a particular dialog presented, analyzer 809 may simply be used for subsequent dialog selection based on rules 811. Another tool provided to compile information about caller 801 in this example is a profiler inference engine 810. Engine 810 may work in conjunction with analyzer 809 to form a profile score about caller 801. Engine 810 has access to information that may be known about the caller such as demographic information, purchase history, and associative data linking the caller to a known group profile known to the system. Data provided by behavioral analyzer 809 and profiler engine 810 may be compared against rules 811, in one embodiment, to determine which of more than one advertisement may be caused to execute at the appropriate juncture in speech application 804.

An ad selection engine 812 is provided in this example as part of voice application server software 718 and is adapted to select and retrieve a VXML-capable advertisement that may be applied in real time to speech application 804 during interaction with caller 801. In this example, runtime engine 808 calls ad selection engine 812 and provides result data from rules base 811 including identification of which ad to select from an available pool of ads.

In this example ad engine is adapted to locate and retrieve the identified advertisement data and deliver same to runtime engine 808 which in turn inserts the ad into the speech application. In one embodiment, where an ad is designed to be executed at its hosted location, selection engine may simply provide a communication link to the selected ad, which may be a simple voice file, whereupon once connected to the caller, the ad automatically plays. In another example, the advertisement is a VXML text string capable of being synthesized to speech and presented to a caller. In another embodiment, the advertisement is a VXML object that may be received and executed as a voice application interactive dialog capable of receiving caller input and causing return of a result. It is noted herein that rules 811 may contain a mix of rules provided by the system host and rules provided by enterprises that apply specifically to enterprise skins.

In one embodiment, an advertiser may also have a skin that may be locatable and executable in conjunction with an enterprise skin wherein the enterprise is registered as a publisher of ads. In this embodiment, an advertiser/publisher matching service 805 may be provided within voice portal 713 along with a set of rules 806 governing the matching process. In this embodiment, once caller 801 is matched to enterprise skin 803 and the enterprise skin is identified as an ad publisher, service 805 may obtain an updated listing of all of the advertisers that have registered for ad placement through that identified enterprise. Rules 806 may be a mix of system host rules, enterprise-specific rules, and advertiser rules. Each advertiser may also have a skin adapted as an executable container within which the advertiser's ads may be identified and located, or within which they may be contained and executed in one embodiment.

According to existing static rules contained within rules 806, the competing advertisers desiring to place ads within speech application 804 are quickly identified. This updated and most current information may be inserted into enterprise skin 803 as a temporary list of advertiser skins available for execution. In this case, runtime engine 808 may obtain the information through enterprise skin 803 and run it against rules 811 to determine according to heuristics of caller 801, the suitable pricing level for running an ad in a particular ad slot and which advertiser will be a highest bidder for a particular ad spot. Ad selection engine 812 may then retrieve and execute the winning advertisers skin, which may contain at least the ad data or object and any interactive VXML code required to enable interaction with the add and retrieval of some result that may be passed on the caller in some way.

As an example of the ad placement capability of the present invention, consider that enterprise skin 803 may be that of a retailer in hardware and home building supplies. Perhaps caller 801 is attempting to order a significant amount of paint from the retailer through speech application 804. Likely, advertisers registered to place ads through the retailer may include those that provide contracted painting services and various competing ads thereof include those that provide a coupon for reducing the overall price per square foot of interior or exterior surfaces. Such advertisers may be on a white list of acceptable contractors used by the retailer to provide professional services.

In the above example, when caller 801 identifies the amount of the paint desired and that it is exterior paint, add selection engine 812 may single out the advertiser skins of those advertisers who are promoting professional exterior home painting service discounts. According to rules 811 and possible 806, the highest bidding advertiser who has an ad promoting exterior painting services may be selected and the advertisers resulting skin may be then executed.

In the example the pertinent ad, which may be an interactive ad, is played in the designated ad slot or space and thus presented to the caller. The caller may then select an option within the interactive ad to receive a discount coupon from the advertiser in email or by some other communication medium. In this case, the cost for placing the ad may be higher because the caller is a qualified customer who may be in immediate need of the service. The winning advertiser then would be one that agrees to the higher cost level. There may be an additional rule provided in case of a tie related to the cost of ad placement.

It may be that caller 801 in the example intends to paint his or her own exterior, or already has a contractor lined up for the job. The caller may then not select the ad option for receiving a discount coupon. However, out of many callers that may call into the paint department during a day, some of those may indeed be looking also for a professional painting service therefore preserving the higher cost for targeted ad placement.

In one further enhanced embodiment, a winning advertiser who has an ad placed through speech application 804 may receive at it's business address or other contact point, a secondary advertisement pulled from a sub-network level created whereby a third party advertiser registered with the host to place advertisements to the "advertisement" enterprises may have static ads or informative references forwarded to those advertisers in a targeted way.

For example, if the painting contractor of the above example places an ad through the retailer, the system may look up any content related ads from a third-party ad pool containing reference or static ads that may be created by those that may support the goals of the particular advertiser like a subcontract painter, for this example. In that case when the advertiser successfully places an ad for painting services, a highest bidding third party ad, perhaps created and submitted to the host by a painter specializing in exteriors may be sent to the advertising enterprise, which in this case is a painting contractor. The painter's ad may be a simple flyer, or perhaps a resume, or a link to an online resume or web site with an offer to accept a painting position with the contractor. In this way the ad network of the present invention may be expanded in one embodiment to include location and delivery of ads found relevant to current business relationships being propagated between the enterprises and the first-level advertisers.

It will be apparent to one with skill in the art that targeted advertising as practiced according to embodiments of the present invention enables new revenue sources to an enterprise served by the system host that may contribute to offsetting of the costs of subscribing to voice application services provided by the host. The host receives revenue from advertisers using the client application and tools to create and conform their ads to underlying voice application architecture common to the enterprises. Advertisers receive more highly targeted ad placements that result in higher conversion rates related to placement/purchase ratios and increase their exposure to numerous enterprise customer bases without having to expend resources negotiating separately with each enterprise. Moreover in the embodiment enhanced for secondary ad referencing, advertisers may save resources normally devoted to acquisition of required labor and resources to perform their advertised services.

Figure 9:
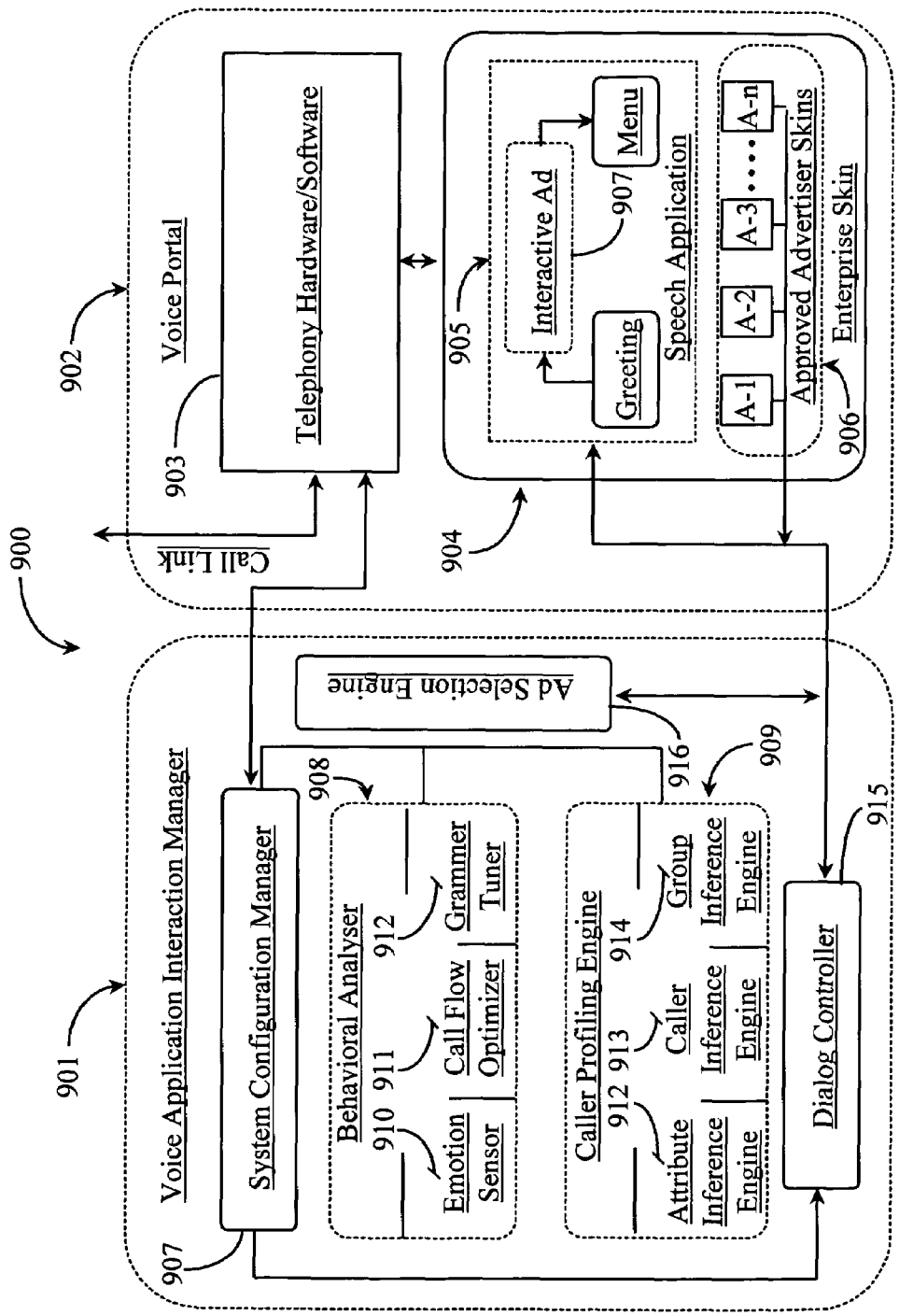
FIG. 9 is a block diagram illustrating a voice interaction manger and voice portal integrated for real time ad selection and service according to an embodiment of the present invention.

FIG. 9 is a block diagram 900 illustrating a voice interaction manger 901 and voice portal 902 integrated for real time ad selection and service according to one embodiment of the present invention. In this example, advertiser may have advertiser specific skins that may be executed in conjunction with enterprise specific skins such that ad delivery may be a matter of connecting VXML objects together within a voice application runtime environment.

Interaction manager 901 may be somewhat similar to interaction manager 807 of FIG. 8. In this example, interaction manager 901 includes a system configuration manager 907 adapted to receive data from a behavioral analyzer 908 and a caller-profiling engine 909. Analyzer 908 and profiling engine 909 may be considered analogous to analyzer 809 and profiler 810 described with reference to FIG. 8. System configuration manager 907 communicates with a dialog controller 915, which is adapted in this example as part of runtime engine functionality and controls dialog selection with respect to a running speech application.

A voice portal block 902 is illustrated in this example and includes the appropriate telephony hardware/software 903 adapted for call processing and call/enterprise connection maintenance. An enterprise skin 904 is illustrated within portal block 902 in this example. This embodiment differs slightly in configuration from the embodiment of FIG. 8. For example, in this embodiment, enterprise skin 904 is served to portal 902 for execution, but is still controlled by the voice application server hosting interaction manager 901 as part of the runtime environment.

Skin 904 is enterprise-specific and includes an enterprise-specific speech application 905. Application 905 relies on voice application architecture shared by all of the subscribing enterprises but contains the voice application functionality specific to the enterprise such that the application when played contains all of the enterprise-specific information and dialog. In this case, application 905 includes a greeting dialog and a menu dialog.

In addition to an enterprise-specific speech application, skin 904 also contains a grouping or list of approved advertiser skins 906 including skins A-1 through A-n. Advertiser skins 906 may be actual executable objects or identification and location references to actual executable objects. Through configuration, an enterprise publisher of ads describes the ad types, and advertiser types that the enterprise is willing to entertain when placing ads. Therefore, advertiser skins 906 represent those pre-approved to be considered when placing ads and those advertisers have also white listed the specific enterprise as a vehicle through which ad placement is desired.

Enterprise skin 904 may be a VXML executable container referencing or containing the actual speech objects comprising the enterprise-specific speech application and also referencing or containing the actual advertiser skins, which may be defined as executable objects. Dialog controller 915 runs enterprise skin from within block 901. Telephony hardware/software block 903 maintains a communication link to the gateway keeping an open line for the current call.

In this runtime environment, a call is being serviced by skin 904 and running speech application 905. A greeting dialog is played for the caller and this dialog may contain a mandatory or optional ad slot to which interactive ad 905 may be plugged into before a main menu dialog is played.

During interaction, system configuration manager 907 both for the purpose of system tuning and selective ad placement monitors caller behavior, in this embodiment. Behavioral analyzer 908 includes an emotion sensor 910, a call flow optimizer 911, and a grammar tuner 912. Emotion sensor 910 is capable of detecting caller mood state by analyzing a sample of the caller's voice. Therefore, emotion sensor 910 may be providing results immediately or as soon as a caller speaks during interaction. Call flow optimizer 911 is capable of ordering a change in dialog presentation order based on a historical pattern of caller behavior interacting with the same voice application, or on caller navigation characteristics in real time. Grammar tuner 912 is responsible for fine-tuning the systems ability to recognize voice input according to natural language input variances that may be spoken by a caller. That is to say that the grammar tuner can incorporate new words and equate them to system responses in addition to those words already in place to invoke those responses.

In normal application analyzer 908 is used to optimize dialog selection and system response. In this example, analyzer 908 is additionally used to provide data applicable for targeting advertisements. Likewise, caller-profiling engine 909 cooperates in unison with analyzer 908. Engine 909, in this example, includes an attribute inference engine 912, a caller inference engine 913, and a group inference engine 914. Normally engine 909 is used to optimize dialog selection and presentation by itself or in cooperation with analyzer 908. In this embodiment, it is additionally used in conjunction with analyzer 908 for placing ads in a much more targeted fashion than can be normally achieved.

This embodiment assumes that speech application 905 has at least one inference point for running an inference and at least one vacant ad slot to be filled. Basically an inference is an operation that is carried out against a set of rules in order to infer what a caller may be interested in and to then adjust the dialog or response options of the speech application appropriately. In one embodiment, either analyzer 908 or engine 909 may be used alone for ad placement. In one embodiment, an enterprise has an option not to include the enhancements provided by these engines. In that case ads may simply be placed based on relative content and highest bidding status.

However, in order to optimize revenue flow from ad publishing, the enhancements provided by engine 909 and analyzer 908 are available and can be optionally configured into the enterprise package and pricing structure. While a caller is navigating application 905, analyzer 908 and engine 909 may be compiling data about the interaction, the caller, and the caller's behavior including current mood state. Such individual categories may be offered as configurable options depending on the enterprise and rules that the enterprise has in place. For example, in a financial institution, emotion and interaction history may be important factors used to streamline service and to enable processing more calls in a given period.

In advertisement, it may be that caller profile, and demographic group profile may be more important factors. Therefore, if the enterprise can provide statistical information about a caller that may lead to a probability that the caller will participate with a specific advertisement, then the advertisement placed at the time of the call interaction would be more valuable then if it were placed randomly.

Advertiser skins 906 may each contain a dialog including background media and one or more selectable options if the advertisement is interactive. Skins 906 are, in a preferred embodiment, related by content to the enterprise application. For example, if the enterprise is a real estate service then one of advertisers 906 may be a roof inspector.

In this embodiment, system configuration manager monitors the interaction and may invoke the services of behavioral analyzer 908 and of caller profiling engine 909. Data results provided by analyzer 908 and engine 909 may be passed to the dialog controller 915, which also has a connection to an ad selection engine 916 (logically illustrated). Based on information provided by controller 915, selection engine 916 may select one of advertiser skins A-1 through A-n and cause it to execute. When the appropriate advertiser skin 906 is executed, it links with speech application 905 and connects the relevant advertisement, in this case, advertisement 907, into the speech application. If the ad is an interactive ad, then it may be connected such that after the ad is played, the caller may select whether to continue on to a next dialog, or return to a previous dialog.

All of the most current competitive information such as advertiser bidding ranges and preferences may be included with each advertiser skin and may be updated each time an advertiser makes a configurative change after logging into the multiple-tenant configuration wizard. Advertiser skins 906 may not actually contain VXML dialog objects but may simply point to those components necessary to retrieve and insert into speech application 905. The convenience of maintaining advertiser skins is that as executables, they may be invoked to automatically sync with and connect to the speech application running in the host enterprise skin.

In one embodiment, there may be more than one advertiser skin executed within one enterprise skin if there is more than one available ad vacancy in an enterprise-specific speech application. In this embodiment, those advertiser skins are pre-approved and may be associated in real time with their assigned slots or ad vacancies when selected and executed during voice application runtime.

One with skill in the art will recognize that enterprise-specific skins may be periodically updated as required when, for example, a new advertiser registers with the system and white lists the enterprise as a desired publisher for ad placement. If the criteria of the target enterprise/publisher for placing ads are acceptable to the advertiser data submitted during configuration, the advertiser skin might be added to list 906 in the enterpriser skin. Likewise, an enterprise may modify its own criterion for accepting ads for placement causing one or more advertiser skins to be dropped from the enterprise skin. The level of complexity may vary with respect to the complexity of the advertiser skin. For example, an advertiser skin may contain or reference a single ad for placement or it may contain or reference multiple ads, each of which must be compared with all of the other competing ads within the skin in order for it to be plugged into an ad vacancy. The convenience of having the ad objects readily available within the enterprise skin during run time may lead to faster placement and less delay.

One with sill in the art of ad placement will recognize that rules used for judging whether a particular ad will be placed in a particular ad slot may include such criterion as content relevancy of an ad to the publisher voice dialog content and acceptable cost parameters (advertiser ceiling compared to publisher requirements). It is noted that in advanced targeting where a caller is profiled, mood sensed, or has an inferred need, the publisher minimum requirement related to cost for ad placement in the same ad vacancy may dynamically rise based on heuristically calculated result data for the particular caller.

Therefore, advertisers may pre-set acceptable cost ceilings for each of these heuristically calculated conditions. For example, if an advertiser accepts $2.00 for placing an ad in any vacancy of the publisher's application, he may also agree to $2.50 for placement wherein the caller is profiled to be one more statistically likely to interact with the placed ad. If the caller is favorably profiled and is mood sensed positively, the advertiser may, for example agree to $3.00 for a placement. Likewise, the competing advertisers approved by the same publisher would pre-set their criteria and an ad comparison process may precede each ad placement for each caller and for each ad vacancy in the voice application of the publisher. An additional cost parameter may be "click through" whereby in a voice application would equate to a caller actually interacting with the ad as an option. An additional cost for each caller interacting with a same ad when placed may also be a tie-breaking factor in ad placement rules. There are many possibilities.

Figure 10:
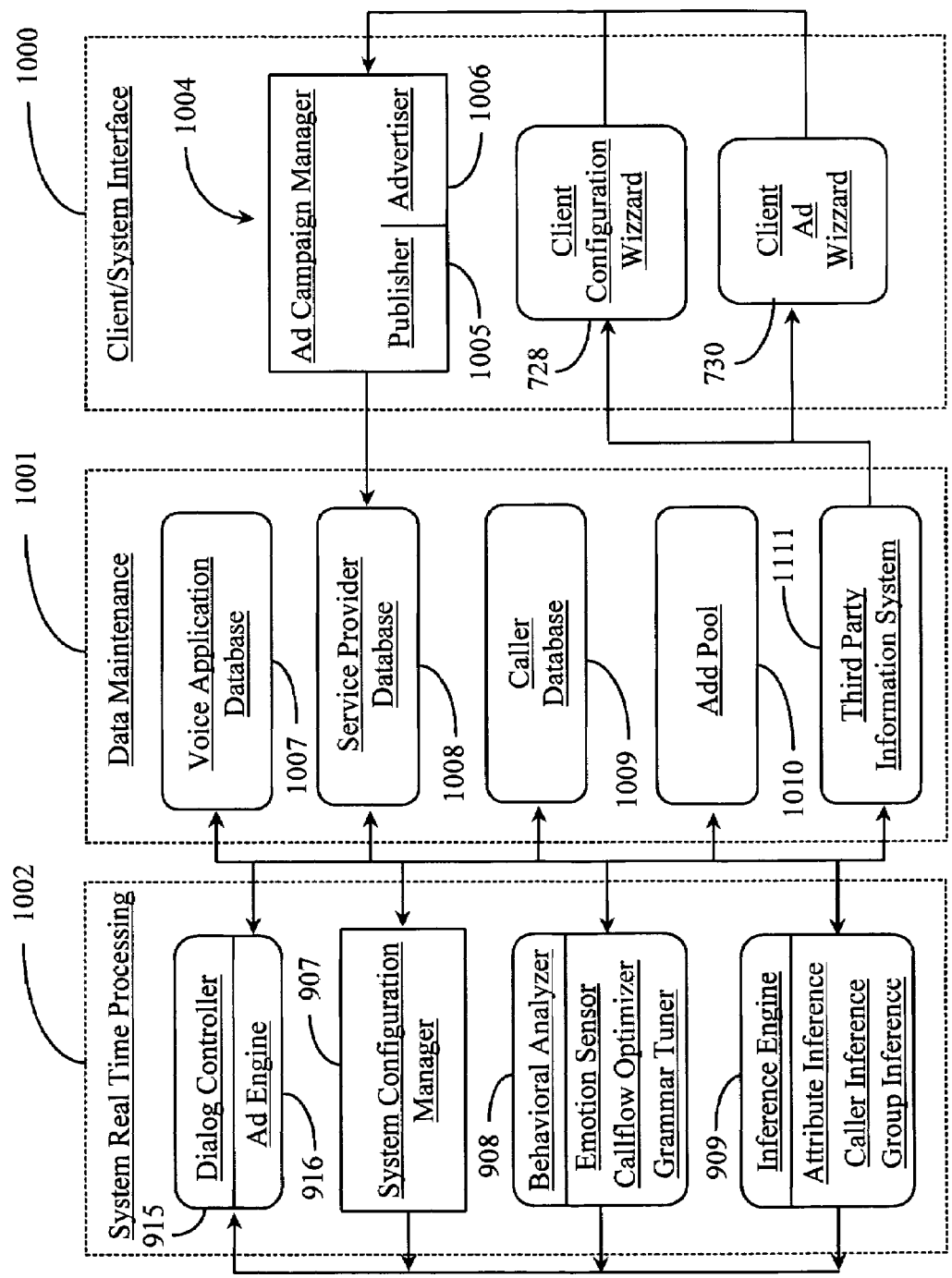
FIG. 10 is a block diagram illustrating integrated layers of interacting components of an ad configuration and delivery network according to an embodiment of the present invention.

FIG. 10 is a block diagram illustrating integrated layers of interacting components of an ad configuration and delivery network according to an embodiment of the present invention. A client/system interface layer 1000 is illustrated in the example and includes client ad wizard 730 and client configuration wizard 728, which were described further above. Ad wizard 730 may optionally be used by an advertisement administrator locally for creating ads and for registering those ads for service placement and for configuring other required parameters and conditions. A publisher having a voice application service subscription may use client configuration wizard 728 locally to create voice application functionality and to create ads and register those ads with the service for placement through other publishers.

An ad campaign manager 1004 is illustrated as a system component within layer 1000 and may be an integrated part of multi-tenant wizard 729 described further above with reference to FIG. 7. In one embodiment, ad campaign manager 1004 has a publisher processing component 1005 and an advertiser processing component 1006. Components 1005 and 1006 are active when publishers and advertisers are logged into the system and are configuring their criterion for ad placement and for ad publishing. An advertiser may or may not use a local client like wizard 730 to connect online with manager 1004. In one embodiment, a client advertiser may simply visit a web site and register for the service at which time the advertiser may select authentication data to use to log in and use the multi-tenant wizard, which may include ad campaign manager 1004.

Manager 1004 may allow physical uploads of ad data and configuration data of an advertiser to a central database like a service provider database 1008 located in a data maintenance layer 1001 on the system side. In one embodiment, manager 1004 provides ad design tools, which may be user-friendly applications for building ads in a format useable for plugging those ads into vacant ad slots in a voice application. Some standardization rules such as the length of the ad, content limitations, interaction limitations, and the like may apply to enable a placement.

An advertiser may see all registered publishers and, in some cases may sample publisher voice applications to see if they are suitable for ad placement. Advertisers may also white list or blacklist certain publishers that they deem not suitable to place their ads. A system-spawned content relevancy wizard (not illustrated) may be provided to help advertisers search for publishers whose voice application content may be relative to an advertised product or service.

It is noted herein that a registered publisher may also be a registered advertiser. Therefore wizard 728 may contain all of the ad components of wizard 730. In the case of a publisher who is also an advertiser, the administrator of the enterprise may log in accordingly in either advertiser mode or publisher mode. In a preferred embodiment, the system performs continuous configuration updates and synchronizes data accordingly when changes are made, new advertisers and publishers are registered, or when advertisers or publishers terminate from the service.

Data maintenance layer 1001, in one embodiment, combines system data storage facilities and third party data storage facilities into one system domain regardless of physical location of the data. A voice application database 1007 is represented within layer 1001 and is adapted to contain the underlying voice application tolls and architecture that is shared among various enterprises using the system. Database 1007 may be part of a voice application server. A service provider database 1008 is represented within data maintenance layer 1001 and is adapted to contain any centrally located enterprise and/or advertiser data uploaded thereto during configuration. In one embodiment, advertiser skins including ad rules, actual ad data or objects may be centrally stored in database 1008. Enterprise data including enterprise skins and enterprise-specific voice application data may also be uploaded to database 1008. Ad campaign manager 1004 has direct access to database 1008.

Layer 1001 may also include a caller database 1009 maintained by the system host on behalf of registered enterprises. Caller database 1009 may contain caller attributes, caller identifications, and caller interaction histories with the system. Caller group demographics may be created and maintained along with other like information and that information may be accessed any time heuristic processing is ordered for an identified caller entering the system to interact with a voice application. Certain information maintained in caller database 1009 may also be made accessible to enterprises servicing those callers. The information can be used by the system to develop more relevant ad placement strategies and by enterprises to help fine tune their enterprise-specific speech application functionality.

An ad pool 1010 is illustrated within layer 1001 and may be adapted as a centralized ad pool containing relevant ads for ad placement. In this embodiment, advertisers may upload registered ads, which may be placed in ad pool 1010 by the system host and maintained therein for local ad placement. A third-party information system 1111 is illustrated within data maintenance layer 1001 and may be adapted as an enterprise information system (EIS) maintained by an enterprise wherein enterprise offered data may be retrieved by the system and played for callers interacting with a relevant enterprise-specific voice application. Third party information system 1111 represents just one of many possible enterprise or advertiser systems that may be referenced for access during voice application configuration and advertisement configuration.

In one embodiment, system 1111 may be maintained by an advertiser and may contain such as ad coupons, or other ad related data served to callers that may be interacting with a placed advertisement. The network address location information and universal resource indicator (URI) information may be provided by enterprises and advertisers configuring services so that the system may locate and retrieve relevant data when required during caller interaction. System 1111 may also be adapted as a remote ad pool for one or more advertisers wherein configured advertisements are maintained for access by a voice application. It is noted herein that databases 1007-1010 may be physically contained in one storage system for centralized access without departing from the spirit and scope of the present invention. It is also noted herein that in the embodiment using campaign manager 1104 as a system component, manager 1004 may oversee data population and data updating with regard to enterprise publisher and advertiser data including billing data, bidding rules, placement preferences, ad location references, and so on.

A system real time processing layer 1002 represents the system components that may be involved in running voice applications, monitoring interactions of those applications and placing relevant advertisements into those running applications. System configuration manager has access to data stored in databases 1007-1010 and might also have remote access to relevant third-party information systems 1111. Dialog controller 915 and ad engine 916 together may control dialog selection in voice applications and ad placement into ad vacancies or slots created in the voice application architecture for the purpose. Therefore ad engine 916 may be adapted to run an ad comparison against a rules base to determine which advertisement will be selected for an ad vacancy and may also be adapted to locate and retrieve the selected advertisement. Once retrieved, the ad engine may leverage the dialog controller to play the ad dialog at the appropriate junction in a running voice application.

Behavioral analyzer 908 and inference engine 909 may have access to databases 1008 and 1009 as may be needed to compile a caller profile, determine if an inference is warranted, and so on. Also components 908 and 909 may work in conjunction with each other and have access to actual runtime data of a caller interaction with an application. For example, emotion sensor data is taken immediately when a caller begins speaking during voice application interaction. Grammar tuner data is also taken during runtime from caller input utterances. It is again noted herein that analyzer 908 and inference engine 909 are not specifically required in order to select advertisements from a pool of competing advertisements for ad placement. However adapting those functions to obtain additional information about an instant caller during interaction can result in data that may lend statistical credence to that caller's likelihood of interacting positively with the placed ad. This fact may be used to create higher value ad placement positions and rules may be provided that allow advertisers to compete against each other for such targeting.

Figure 11:
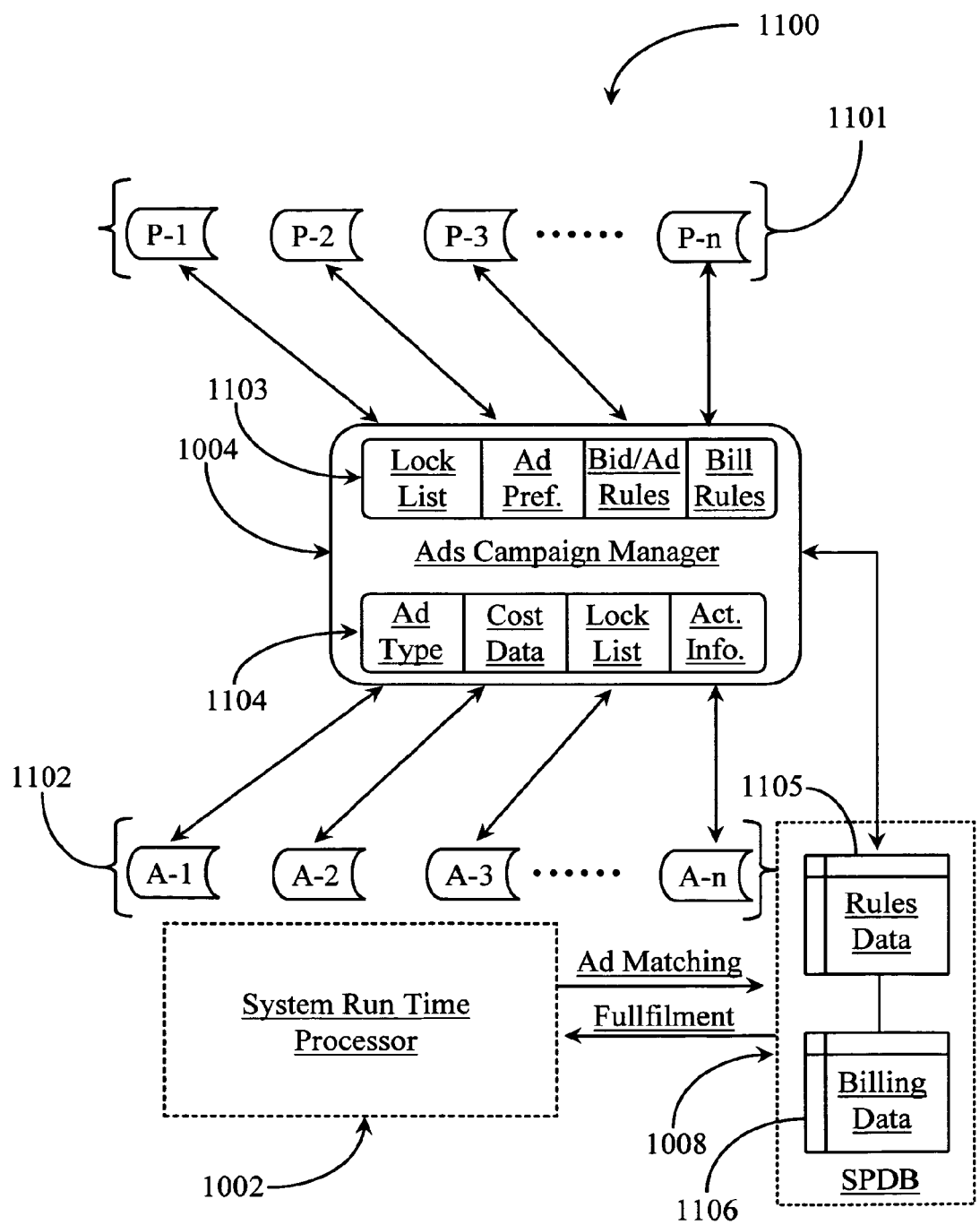
FIG. 11 is a block diagram illustrating functions of a multi-tenant ad campaign manager according to an embodiment of the present invention.

FIG. 11 is a block diagram 1100 illustrating functions of multi-tenant ad campaign manager 1004 according to an embodiment of the present invention. Ad campaign manager 1004 may be part of multiple tenant configuration wizard 729 as previously described. In this embodiment, campaign manager 1004 enables client configuration and registering of ads in the system and also enables publisher configuration of the ads they may agree to run and under what conditions they will place the ads.

Publishers 1101 (P-1 through P-n) may at any time log into ads campaign manager 1004 in order to create the "conditions" under which they may place ads into their enterprise-specific voice applications. A set of configuration options 1103 is provided to enable publishers 1101 to create those conditions. For example, options 1103 include a lock list configuration interface adapted to enable a publisher to black list advertisers that they, under any circumstance, would not place ads for. In this case, the publisher may acquire, through the manager, the list of all of the registered advertisers and a general description of what they are advertising. It is noted that some of those advertisers may include other registered publisher enterprises. If they have ads for placement, they may be included in the list. Those advertisers who have already blacklisted the publisher for ad placement may not be included in the list shown.

The publisher may create a white list of approved advertisers. In this case no advertisers would be allowed to place ads through the publishers interface unless they are located on the approved list or lock list. The publisher may then create a description of the ad types and preferences for ads placed. In this interface the publisher may set some standards like interactive ads only not to exceed a specified length of time, which may be one of more than one system standard time slots. The publisher may perform a different ad preference configuration for each available ad slot included in the publisher's voice application version.

The publisher may also create bidding rules and parameters that are used in part to determine which among all of the competing ads will be placed in which ad vacancy at a given instance during voice application interaction. Options 1103 also include an ad rules interface, which enables the publisher to create subtle rules for selecting and publishing ads. For example, if two separate ads tie in terms of bidding ceiling for placement in a particular ad slot, then a tie breaking rule may be created that causes selection of the ad that is most relevant to the dialog subject matter. Another tie breaking rule may cause the newest of those ads to be placed if both ads tie in bidding for a slot. Still another rule may prefer the ad of an advertiser with a better payment history or credit score. There are many possibilities.

Advertisers 1102 (A-1 through A-n) may log into campaign manager 1004 at any time to configure and register ads for possible placement. As part of local client wizard or multi-tenant wizard function, an ad tool kit may be provided for helping advertisers to create VXML-capable ads, which are executable at the time of ad selection and placement so that those ads selected and placed may seamlessly install into ad slots assigned to them upon selection.

Options 1104 are provided to enable an advertiser to register ads and to set preferences for ad placement. Options 1104 include an option for describing ad type parameters. This interface may be presented as an electronic form, which may contain categorical fields for inputting data required by the system to register an ad. An ad type parameter may define the ad as interactive or static. The ad length may be required and the length may be required to conform to one of standard lengths defined by the system host. Product or service description may be required. Ad format may be required, for example, whether a sound file is part of the ad or whether the ad is a VXML text string to be voice synthesized. Ad location information may also be required if an ad is to be served from a remote location and not physically uploaded to a central location.

A next option interface included in options 1104 is cost data. This interface enables the advertiser to set specific cost ranges for ad placement, and in some embodiments, ceilings for high-value targeting add placement. An advertiser may set a limit of, perhaps $1.49 for placement of the ad with a particular enterprise and, perhaps another amount for placement of the same ad with a different enterprise. The placement costs are used in part to determine which of several competing ads may be placed in a particular ad slot.

A lock list interface is also provided within options 1104 to enable the advertiser to set preferred publisher lists for each ad. An advertiser may also blacklist certain publishers. An account information interface is provided within options 1104 to enable the advertiser to input bank account information or credit card billing data connected to an account that may be automatically drawn from by the publisher on a regular basis for compensating the publisher for ad placement. An advertiser may see all of the publishers registered to place ads and select those that that the advertiser may desire to place ads with. For each publisher listed, there may be also listed the general ad acceptance criteria the publisher deems necessary for an advertiser to qualify for inclusion. In this way, an advertiser may modify ads to conform to rules set by highly desired publishers.

Publishers and advertisers may be charged a nominal subscription fee for subscribing to the ad-matching and delivery system f the present invention. Once advertisers and publishers have registered and completed their configuration tasks, system runtime processor 1002 may perform ad matching of advertisers to publishers in real time as callers interact with enterprise-specific voice applications in the multi-tenant voice system. In addition to matching advertisers and publishers in real time based on available data, ads submitted by advertisers approved for a specific publisher are matched in real time to ad vacancies or slots provided within the enterprise-specific voice application version being presented to callers by the publisher the advertisers are matched for ad placement.

Rules data 1105 and billing data 1106 may be maintained in service provider database 1008 in this example. Therefore, matching of advertisers to publishers and competitive ad selection and placement may be performed in real time and relies on the most current available system data submitted by both publishers and advertisers. Service provider database 1008 also provides back-end billing data that the system may use in addition to system activity records to document billing rates and to enable fulfillment of the obligations of advertisers when their ads are placed. Such compensation may relate to advertisements placed and in addition to advertisements interacted with after placement if such interaction is optional in the voice application.

In one embodiment, as further described above, a third level pool of reference ads may be solicited from certain entities and may be maintained by the system host wherein such ad references may comprise job resumes, or other service or resource advertisements, that may be submitted by third parties and may be relevant to actual real time business interactions being carried out by the host system. Such reference ads are not inserted into voice applications, but may be simple email advertisements or the like that may be forwarded to content-relevant advertisers whom have had ads placed by the host. In one embodiment, when an advertiser has an ad placed and interacted with positively, a competing third-party reference ad may be forwarded to the advertiser by the system. In a preferred embodiment, the resource reference is most relevant to the content of the interaction between the publisher's customer and the placed advertisement. A motivation exists enabling solicitation of third-party reference advertisers the motivation raised by the host's capability of serving these reference ads to relevant advertisers who may have just acquired new business through ad matching and ad placement services.

In the above enhanced embodiment, reference ads in the form of emails, instant messages, or the like may be selected according to competitive rules and content relevancy and may be forwarded to those advertisers who have agreed to receive such resource references. In this way, the system host may provide a value added service to advertisers that works to help reduce costs of locating resources including employee resources that may be desired, especially if the advertiser has been successful with ad placement. There are many possibilities.

Figure 12:
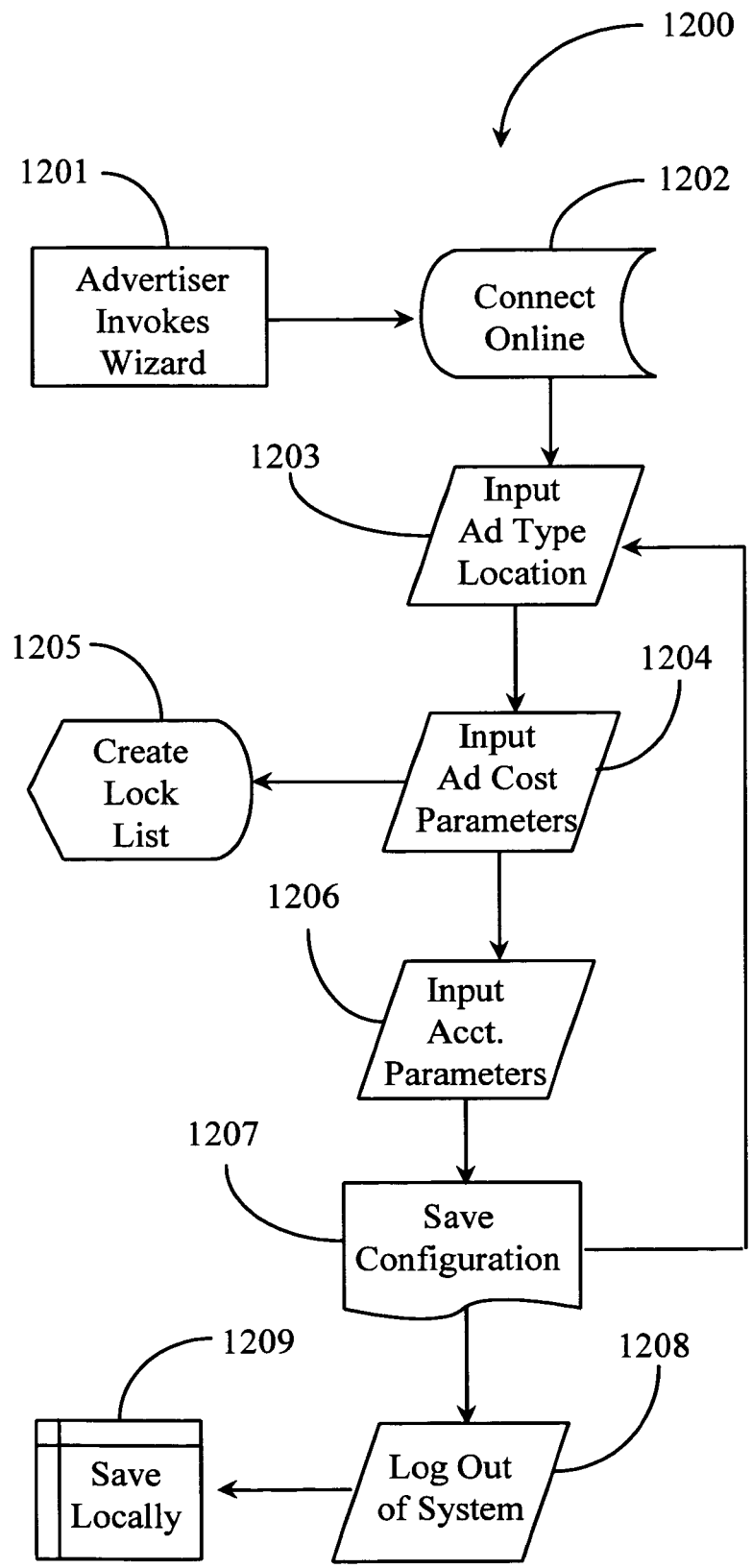
FIG. 12 is a process flow chart illustrating steps for registering an ad for placement according to an embodiment of the present invention.

FIG. 12 is a process flow chart 1200 illustrating steps for registering an ad for placement according to an embodiment of the present invention. At step 1201 an advertiser invokes a local client wizard adapted to enable ad configuration and registration to the system host. The local client wizard is optional in step 1201 as the advertiser may simply navigate to a secure site using a browser to interact with a multi-tenant wizard. However, a local wizard may provide the capability of off-line configuration and may provide for the capability of saving the configuration locally for off-line modification.

At step 1202, the client wizard may be used to connect online, using browser-based technology, to a multi-tenant configuration wizard. At step 1202, an authentication procedure such as an administrator login requirement may be performed to authenticate the agent for the advertiser to the host system. In one embodiment, for first time use, the agent for the advertiser may register with the service and receive confirmation and a log in code or pass phrase with which to login for ad registration for placement.

At step 1203, the advertiser agent or administrator, whether using the local configuration wizard offline, or the online multi-tenant wizard, may input ad type and ad location. In one embodiment, the advertiser may physically upload the ad data to a central repository of ad pool maintained by the system host. The ad may be provided of the form of a VXML text string for voice synthesis or a VXML voice object that has been pre-recorded. At step 1204, the agent for the advertiser or administrator may input ad cost parameters. These may include but re not limited to maximum ad placement cost that the advertiser is willing to bid for placement. Moreover, these figures may be different for different publishers that the advertiser whishes to place the ad through. The advertiser may also set bid amounts related to actual customer participation occurrence after an ad has been placed. The advertiser may also elect to participate in a high value targeting placement scenario wherein callers are monitored to acquire profiling information that may be used to further relate an ad to a particular slot.

In one embodiment, an advertiser agent may connect online and using a multi-tenant interface, may monitor ad placement performance of the system related to the advertisers' particular ad campaigns. In this embodiment, the advertiser may make configuration changes such as raise or lower the amounts that the advertiser is willing to pay for placement and, in some cases, in case of customer participation or "click through".

At step 1205, the advertiser agent or administrator may create a lock list identifying preferred publishers and, perhaps blacklisting certain publishers where the advertiser does not want to place the ad. A publisher may also be an advertiser. At step 1206 the advertiser may input financial account parameters required by the system and publishers for obtaining compensation for matching and running ads for the advertiser. At step 1207 the agent for the advertiser may save a configuration to the system host thereby registering an ad for placement. It is noted herein that the exact number of ads an advertiser may ultimately register with the system host may not be limited, however, the ads may each be configured separately depending on criteria, desired placement slots, content relevancy to publisher, and so on. For example, there may be pricing differences between static and interactive advertisements.

At step 1208, the advertiser agent, finished with the current session may log off of the system and terminate the current Internet session. At step 1209 the advertiser agent may also save his or her configuration to a local database. In this embodiment, a locally client will enable the agent to invoke and modify the configuration without connecting online wherein the agent may connect only to upload or sync a modified configuration with the host system.

In one embodiment, each separate ad must be separately configured and cost factored since ads will compete against each other for placement. In this case, if an advertiser agent as more than one ad to register with the system host, step 1207 may resolve back to step 1203 for the next advertisement. Once a session is finished, the agent may log out of the system at step 1208 and save his configuration locally at step 1209 if he or she is using a local client wizard to connect. Configurations saved locally might then be accessed and modified locally whereupon once reconfigured may be uploaded to the system host for synchronization.

It will be apparent to one with skill in the art that the order and number of steps making up process flow 1200 may vary somewhat without departing from the spirit and scope of the present invention. For example, if a client is not using a local client wizard. Which may be optional, then step 1202 may be the first step in the process flow and step 1208 may be the last step. In one embodiment there may be an additional step for indication whether or not third-party advertisement s will be accepted by advertisers when their ads are placed and interacted with according to an embodiment described further above.

In still another embodiment, the information provided by the advertiser may be compiled per ad or per ad group into an advertiser skin adapted as an ad container object that may be executed to connect to an enterprise skin for ad delivery. There are alternate embodiments for facilitating actual connection of a voice advertisement to an enterprise-specific voice application ad slot.

Figure 13:
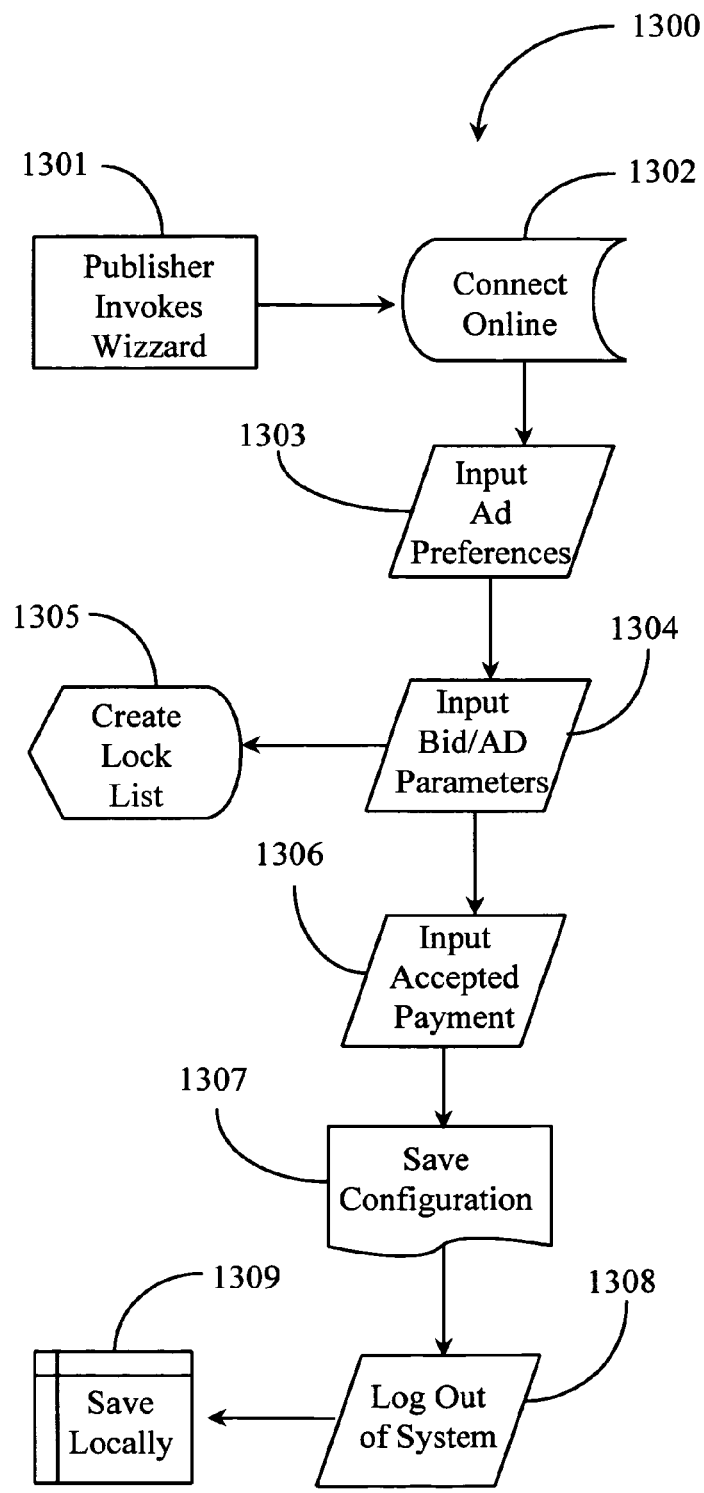
FIG. 13 is a process flow chart illustrating steps for identifying advertisers and ads accepted for placement according to an embodiment of the present invention.

FIG. 13 is a process flow chart 1300 illustrating steps for identifying advertisers and ads accepted for placement according to an embodiment of the present invention. At step 1301 a publisher agent or administrator invokes a local configuration wizard. As described above with respect to FIG. 12 step 1201, this step may be optional depending upon whether a client wizard is available or not. Assuming step 1301 is undertaken, at step 1302, the publisher agent connects online to a multi-tenant wizard. It is noted herein that in this step and in step 1202 described with reference to FIG. 12 above, the online application may include a campaign manager analogous to manager 1004 described with reference to FIG. 10.

At step 1303, the publisher agent inputs ad preferences for ads that the publisher is willing to consider for ad placement. These preferences may include ad type identifications (static or interactive) and ad length for both categories. Content relevancy may be strictly observed so that no advertisements are accepted that would not be completely relevant to a publisher's voice application content.

At step 1304, the publisher may input bidding and other ad-related parameters or rules. For example, a publisher may set one or more minimum bid requirements for placement in a particular ad slot or space. Further the publisher may set a raised minimum amount for the same slot under different conditions. For example, a publisher may set a higher minimum bid requirement for placement wherein callers are profiled and are, at the time of the call, determined to be statistically more likely than the normal case to interact with an ad placed in the space. On the other hand, if a negative result arises from a caller profiling or emotion sensing process, the publisher may agree to revert back to original bid minimum for placement in that slot. A publisher may also require an additional amount for placed ads where positive interaction has occurred between the caller and the ad. These additional charges may only be applied in real time if the conditions and activity transpired warrant them.

At step 1304, the publisher agent may also set some basic ad rules for ad comparison purposes. For example, tie-breaking rules may be submitted by the publisher that may be instituted based on prior experience with advertisers already doing business with the publisher. For example, if 2 ads belonging to different advertisers approved for placement in a publishers application tie for placement in a particular ad slot according to relevancy and bid amount, then the publisher may favor the advertiser that has a better payment history with the publisher. In a same situation, a publisher may alternatively favor a newer advertiser over an older one in order to raise the level of competition between those advertisers.

At step 1305, the publisher may create a lock list preventing certain advertisers who may be competitors, for example, from placing any advertisements through the publisher's application regardless of bid amount or other relevancy factors. Likewise, the publisher may white list certain advertisers that the publisher deems most appropriate to the publisher's business activity.

At step 1306, the publisher agent may input the accepted terms of payment for ad placement. These terms may be generalized for all advertisers such as billing for activity on a monthly basis from a charge card or perhaps automatically debiting from a specific advertisement account periodically, wherein the account must maintain a minimum balance to be active.

During system matching of advertisers to publishers, all of the factors and requirements are compared to determine the number of advertisers that will be approved for a number of publishers. This matching process may, in one embodiment, be performed periodically as advertisers and publishers update their preferences and requirements. In one embodiment, a system check may be performed for each caller connected to a publisher to determine if the publisher has made any modifications that may exclude existing approved advertisers, or if any new advertisers may be included for ad comparison related to ad placement for the instant caller.

At step 1307, the publisher agent or administrator may save the current configuration at the host and may then log out of the system at step 1308. At step 1309, the publisher agent may save the configuration locally so that is may be modified subsequently while off-line using a local configuration wizard.

One with skill in the art will appreciate that there may be fewer or more steps included in process 1300 without departing from the spirit and scope of the present invention. For example, if no local client configuration wizard is provided, then the process may begin with step 1302 and may end with step 1308. Likewise if a publisher is new to the system, more steps may be inserted for registering and receiving login credentials for subsequently logging into the system to set preferences. At step 1302, the publisher agent may actually login to a multi-tenant ad campaign manager analogous to manager 1004 described with respect to FIG. 10. Moreover, for a publisher, the ad campaign portion and the voice application configuration portion may be part of the same application functionality available to the publisher.

Figure 14:
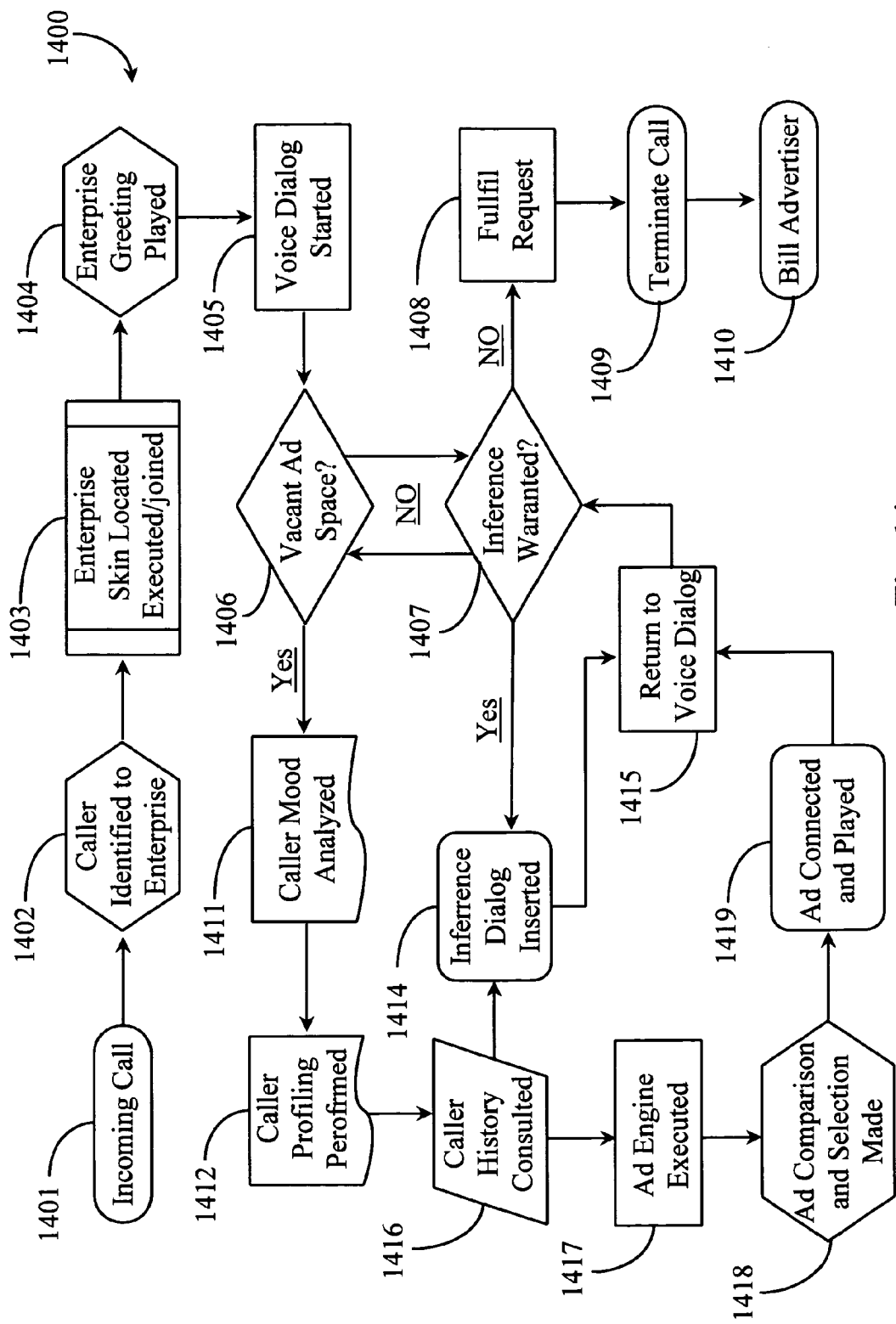
FIG. 14 is a process flow chart illustrating steps for detecting ad vacancies, selecting an ad and inserting the ad into a running voice application according to an embodiment of the present invention.

FIG. 14 is a process flow chart 1400 illustrating steps for detecting ad vacancies, selecting an ad and inserting the ad into a running voice application according to an embodiment of the present invention. At step 1401, the system accepts an incoming call. At step 1402, the caller is identified to a specific enterprise, in one embodiment through DNIS. At step 1403, the enterprise skin specified by the caller identification at step 1402 is executed, if not running, and connected to the call. If the skin is running and servicing other callers then the caller is connected to the running application art the appropriate starting point.

At step 1404, an enterprise greeting is played to the caller. This greeting dialog may or may not have voice-selectable options. At step 1405, voice application dialog is played. If at step 1404 there was a selectable option, then at step 1405 the appropriate dialog invoked according to the caller's selection is played. At step 1406, the system host determines if there is a vacant ad space to be filled in the dialog. An ad space may simply be a connector for inserting an ad dialog. If there is no ad space to fill, the system also determines at step 1407 if there is an inference warranted. An inference point is not relevant to ad placement, but may be relevant to whether dialog optimization is performed as is described in co-pending application. If there are no ad spaces or inference points, then at step 1408, the system fulfills the caller's request according to the enterprise options selected and may terminate the call at step 1409. In this case, there were no ad spaces and the enterprise was not an ad publisher.

At step 1406, if there is an ad space vacant then at step 1411, caller mood state may be analyzed using an emotion sensor described above as part of a behavioral analyzer controlled by the system host. Step 1411 is optional and is not specifically required for ad selection and placement. However, such analysis may contribute to higher level targeting for competing ads. At step 1412, caller profiling may be performed according to caller behavior detected thus far in interaction and any attributes that may be known about the caller. At step 1416, caller history may be consulted if it is available to the system. This history may help in profiling the caller to determine if higher revenues for ad placement may be appropriate. Steps 1412 and 1416 are not, however, specifically required in order to successfully select and place ads.

At step 1417, an ad engine is executed. The ad engine may be analogous to engine 916 described with reference to FIG. 9 above. In one embodiment the ad engine is responsible for determining if the enterprise connected to is in fact a registered ad publisher and if there are advertisers approved by the publishing enterprise. In this case, such a determination may be made at the time of call connection and at least one vacant ad space would then be expected at step 1406 if the enterprise is determined upfront to be a publisher of ads.

At step 1418, the ad comparison is performed and a winning advertisement is selected from a pool of approved advertisements. In one embodiment, the ad pool is represented as a plurality of advertiser skins contained in or at least referenced by the enterprise skin. In this embodiment at step 1419, the advertisement selected at step 1418 is executed to play by virtue of executing the advertiser skin containing the ad. In this case the ad may already be contained within the skin and may automatically play at the appropriate assigned ad space. In this embodiment, the caller may interact with the advertisement in step 1419 order to receive some result like a discount coupon that may be mailed or emailed to the caller if the caller provides the contact information or it is already known by the system.

In another embodiment, a caller may interact with the advertisement by voice at step 1419 wherein selecting an option may cause the system to establish an advertised credit associated with a web site of the advertiser or the publisher whereby the caller may subsequently navigate to the destination and be credited in the course of completing a transaction.

In one embodiment, advertisements are maintained in an ad pool by the system host. In this embodiment, the advertisement is retrieved from the ad pool at step 1419 and executed in the appropriate dialog sequence controlled by the dialog controller. In still another embodiment, the winning ad may be served from a remote database or information system maintained by the advertiser not the host. In this case, the ad is served to the voice application server whereupon it is executed or played for the caller.

Once the caller has finished interacting with the advertisement, or in the case of a static ad, once the ad is finished playing, the caller may be returned to the next voice dialog at step 1415. The process may revert back to steps 1407 and 1406 wherein the system may determine if there are any inference points or any more ad spaces to fill. If not, the process may revert back to step 1408 wherein the caller's request with the enterprise may be filled. At step 1409 then the call may be terminated. At step 1410, if there was ad placement and/or caller interaction with a placed ad, the system may log the activity, deduce the rate owed and bill the advertiser on behalf of the publisher or at least log the amount on behalf of the publisher so that the publisher may according to a billing schedule, bill the advertiser.

If there is another vacant ad space pending then the ad engine may be invoked again at step 1417. Since steps 1411, 1412, and 1416 may have already been performed on the instant caller, step 1406 for a second ad vacancy may skip those steps and resolve to step 1417. If at step 1407, an inference is warranted then based on results that may be performed in steps 1411, 1412, and 1416, an inference dialog is selected and played at step 1414. However, inference dialogs have no relevancy to ad placement specifically; step 1414 is illustrated to demonstrate that steps 1411, 1412, and 1416 may be performed to obtain information for either or both cases. A voice application may include both inference points and vacant ad slots. Moreover, ads may be placed without profiling the caller or mood sensing the caller, or consulting any information compiled by the system about the caller. In this case after an ad space is determined to be pending at step 1406, the process skips to step 1417.

In still another embodiment, the enterprise-specific voice application contains a notification mechanism that may be used to alert the system host whenever a pending ad vacancy needs to be filled. In this embodiment, the publisher skin may send out a request for ad service to the host, which would otherwise not invoke ad comparison and selection. In this case, the system manager would receive the request and invoke the ad engine, which would then qualify ads for the publisher and compare those ads against a set of rules to determine which ad will be returned. The winning advertisement would then be served to the enterprise skin wherein the dialog controller could execute and play the advertisement in proper sequence among the voice application dialogs. Also in this case, the actual ad may be served from ad pool hosted by the system; an ad pool maintained by an advertiser, or a third-party ad server connected to the network.

It will be apparent to one with skill in the art that the nature and order, including the number of steps included within process 1400 may vary somewhat from the stated nature, order and number without departing from the spirit and scope of the present invention. For example, in an embodiment wherein ads are selected and served but higher value targeting is not enabled, steps 1411, 1412, and 1416 may not be required unless inference mode is enabled. Moreover, steps 1411, 1412, and 1416 may be performed in differing orders without departing from the spirit and scope of the present invention.

Likewise, there may be an additional series of steps for sending third party ad references to advertisers whom have had one or more advertisements placed and interacted with during the course of an interaction with a caller. For example, after billing the advertiser in step 1410, an additional step for sending a content relative resource ad to the advertiser may be included. The number of these sent to an advertiser based on a caller interacting with a placed advertisement may vary according to rules set up between the host and such entities solicited to have their reference ads placed. For example, a painter may be competing with other painters to have a reference ad placed with an advertiser who is a painting contractor. If the contractor's ad is interacted with by a caller, or by a pre-set number of callers, the system may determine that more than one relevant ad submitted by painters should be forwarded to the advertiser. This embodiment assumes that the advertiser has agreed to receive resource ads relevant to the advertisers business with the caller or callers and that each resource has agreed to pay the host for such a submission of their reference ad to the advertiser. There are many possible variant embodiments.

The methods and system of the present invention can be practiced over the Internet network or any other accessible WAN. Rules for matching advertisers to publishers and advertisements to ad vacancies may vary widely according to the nature of publishers and advertisers and the extent that those entities are willing to publish ads and have ads published. In a preferred embodiment, the host provides basic business guidance rules that facilitate most situations. Unlike other ad placement systems, the system of the present invention fosters competition among advertisers for the most relevant ad exposures according to not only content relevancy, but also real time heuristic analyses of potential interaction participants (callers). In this way advertising may be performed in such a way as to further increase ad conversion rates for advertisers over that normally obtained through other know systems.

The methods and apparatus of the present invention according to the many embodiments described herein should be given the broadest scope under interpretation. The spirit and scope of the present invention should be limited only by the claims that follow, which are supported in the specification of this application and in co-pending applications listed in the cross-reference section, under which appropriate claims of priority should also be given. Also One with skill in the art of voice application technologies will appreciate that a variety of existing XML-based text-to-voice markups may be leveraged to create text strings or objects for voice synthesis using text-to-speech synthesis without departing from the spirit and scope of the present invention such as, for example, speech application language tags (SALT), J speech extensible markup language (JSML) and other standard XML-based mechanisms. The present invention, therefore, is not limited strictly to VXML rendering

What is claimed is:

1. An advertisement delivery system comprising:
 a multi-tenant voice application system running a plurality of tenant-specific voice applications;

a plurality of voice-enabled advertisements;

a publisher configuration manager to enable tenants to create and register voice applications in the system, and to configure advertisement publishing conditions and constraints, including price constraints; and a service application executing in the multi-tenant voice application system, wherein the service application includes a configuration manager to enable advertisers to register advertisements in the system and to configure advertisement parameters, including price constraints, wherein if a vacant advertisement position exists in a running voice application, the service application selects an advertisement from the plurality of voice-enabled advertisements, and causes the selected advertisement to be played in the voice application, wherein the advertisement is selected based on:

content relevancy of the advertisement to the voice application;

a plurality of selections entered by a user during a current user session navigating the voice application; and results of an advertisement competition among a plurality of advertisers.

2. The system of claim 1 wherein the voice-enabled advertisement is a voice extensible markup language text string or a voice extensible markup language executable object.

3. The system of claim 1 wherein the voice-enabled advertisement is one or a collection of pre-recorded voice files and voice extensible markup language executable code.

4. The system of claim 1 wherein the voice application versions are enterprise-specific variants constructed over common voice application architecture.

5. The system of claim 1 wherein text-to-speech voice synthesis is used to play the advertisement.

6. The system of claim 1 wherein the advertisement competition includes recognition of a highest bid by an advertiser.

7. The system of claim 1 wherein if a vacant advertisement position does not exist in the running voice application, the service application omits selection of an advertisement and omits playing an advertisement in the voice application.

8. The system of claim 1 wherein each running voice application has a single advertisement position.

9. A service application comprising:

a publisher configuration manager enabling creation and registration of voice applications in a system, the publisher configuration manager further to configure advertisement publishing conditions and constraints, including price constraints;

a configuration manager enabling advertisers to register advertisements in the system and to configure advertisement parameters, including price constraints;

an application interface enabling receipt of data about caller selections entered during a current session while a caller navigated a tenant-specific voice application among a plurality of tenant-specific applications in a multi-tenant center, and further enabling receipt of data about individual advertisements among a plurality of advertiser-specific advertisements accessible in the multi-tenant center, the data about individual advertisements including advertisement price constraints; and a processor processing the data about the caller selections and the data about the advertisements, considering constraints and conditions, and selecting as a result of the processing one advertisement to place in the voice application.

10. The application of claim 9 wherein the advertisement is voice-enabled in the form of a voice extensible markup language text string or a voice extensible markup language executable object.

11. The application of claim 9 wherein the advertisement is voice-enabled in the form of one or a collection of pre-recorded voice files and voice extensible markup language executable code.

12. The application of claim 9 further comprising enabling receipt of data describing one or a combination of profiled attributes of the caller acquired during one or more previous interactions with the caller.

13. The application of claim 9 wherein the voice applications are enterprise-specific variants constructed over common voice application architecture.

14. The application of claim 9 wherein the constraints and conditions are configured by advertisers and tenants.

15. The application of claim 9 wherein interaction by a caller with an advertisement placed in the voice application with which the caller interacts includes caller receipt of some acknowledgement, confirmation, or indication of product or service participation.

16. A method for selecting an advertisement to be presented to a caller interacting with a voice application comprising:

identifying an incoming call and the caller;

connecting the identified call to a tenant-specific voice application from among a plurality of tenant-specific voice applications in a multi-tenant center, wherein the plurality of tenant-specific voice applications are created and registered by a plurality of tenants;

identifying advertisements approved for consideration for placement in the identified voice application, wherein the advertisements are registered and configured by a plurality of advertisers, and wherein the advertisements have associated publishing conditions and constraints, including price constraints, determined by the advertisers;

accessing data about caller selections entered during a current navigation session;

accessing data about the advertisements including results of a competition among the advertisements approved for consideration; and determining a specific advertisement to place in the voice application based on caller selections entered during a current navigation session and data about the advertisements.

17. The method of claim 16 further comprising accessing data about the caller regarding caller historical activity and caller profile attributes.

18. The method of claim 16 wherein the results of the competition among the advertisements approved for consideration includes considering a bid amount for placement of the advertisement.

* * * * *